US012654514B2

(12) United States Patent
Kim et al.

(10) Patent No.: US 12,654,514 B2
(45) Date of Patent: Jun. 16, 2026

(54) CABIN COOLING/HEATING SYSTEM WITH CABIN FLOOR COOLING/HEATING FUNCTION FOR A VEHICLE

(71) Applicants: HYUNDAI MOTOR COMPANY, Seoul (KR); KIA CORPORATION, Seoul (KR); DOOWON HEAVY INDUSTRIAL CO., LTD., Sacheon-si (KR)

(72) Inventors: Yeong Jun Kim, Incheon (KR); Hochan An, Hwaseong-si (KR); Yeonho Kim, Seoul (KR); Jeawan Kim, Hwaseong-si (KR); Gwi Taek Kim, Cheonan-si (KR); Man Hee Park, Suwon-si (KR); Jae Yeon Kim, Hwaseong-si (KR); Hoyoung Jeong, Hwaseong-si (KR); Yun Ki Kwon, Seoul (KR); Jeong Bin Moon, Anseong-si (KR); Tea Jin Lee, Pyeongtaek-si (KR)

(73) Assignees: HYUNDAI MOTOR COMPANY, Seoul (KR); KIA CORPORATION, Seoul (KR); DOOWON HEAVY INDUSTRIAL CO., LTD., Sacheon-si (KR)

( * ) Notice: Subject to any disclaimer, the term of this patent is extended or adjusted under 35 U.S.C. 154(b) by 119 days.

(21) Appl. No.: 18/604,662

(22) Filed: Mar. 14, 2024

(65) Prior Publication Data

US 2025/0162382 A1     May 22, 2025

(30) Foreign Application Priority Data

Nov. 16, 2023    (KR) ........................ 10-2023-0158986

(51) Int. Cl.
B60H 1/32 (2006.01)
B60H 1/00 (2006.01)

(52) U.S. Cl.
CPC ....... B60H 1/3228 (2019.05); B60H 1/00899 (2013.01)

(58) Field of Classification Search
CPC .............. B60H 1/3228; B60H 1/00899; B60H 1/00921; B60H 1/00321; B60H 1/00485;
(Continued)

(56) References Cited

U.S. PATENT DOCUMENTS 11,142,105 B2    10/2021  Cha
2009/0289045 A1*  11/2009  Hotary ................... B60N 3/044
219/202
(Continued)

FOREIGN PATENT DOCUMENTS

DE    102008013450 A1 *  9/2009  ......... B60H 1/00321
DE    102018129337 A1 *  5/2020  ......... B61D 27/0054
(Continued)

*Primary Examiner* — Kun Kai Ma
(74) *Attorney, Agent, or Firm* — Lempia Summerfield Katz LLC

(57) ABSTRACT

A cabin cooling/heating system for a vehicle includes: a heat pump system configured to generate a cold refrigerant and a hot refrigerant; an air conditioning device configured to receive the cold or hot refrigerant from the heat pump system, generate cold or warm air by using the cold or hot refrigerant, and blow the cold or warm air to a front cabin of the vehicle; a floor heat exchanger configured to receive the cold or hot refrigerant from the air conditioning device and cool or heat a cabin floor of a rear cabin of the vehicle by circulating the cold or hot refrigerant; and a line switching valve module configured to send the cold or hot refrigerant to the floor heat exchanger or send the cold or hot refrigerant to the heat pump system.

17 Claims, 12 Drawing Sheets

(58) Field of Classification Search
CPC .............. B60H 1/00564; B60H 1/3204; B60H
1/00835; F24F 5/0089; F25B 25/005
See application file for complete search history.

(56) References Cited

U.S. PATENT DOCUMENTS

| | | | |
|---|---|---|---|
| 2020/0376988 A1 | 12/2020 | Cha | |
| 2021/0101439 A1* | 4/2021 | Hayes | ................ B60H 1/00207 |

FOREIGN PATENT DOCUMENTS

| | | | | |
|---|---|---|---|---|
| DE | 102022105115 A1 * | 9/2023 | ......... | B60H 1/00278 |
| JP | H0554018 U * | 7/1993 | | |
| JP | 2005280639 A * | 10/2005 | | |
| JP | 2009002598 A * | 1/2009 | ............ | B60H 1/323 |
| JP | 2015020693 A * | 2/2015 | | |
| KR | 102238044 B1 | 4/2021 | | |
| WO | WO-2012144445 A1 * | 10/2012 | .............. | B60L 58/30 |
| WO | WO-2016013193 A1 * | 1/2016 | .......... | B60H 1/2209 |
| WO | WO-2017006775 A1 * | 1/2017 | ......... | B60H 1/00207 |

* cited by examiner

CABIN COOLING/HEATING SYSTEM WITH CABIN FLOOR COOLING/HEATING FUNCTION FOR A VEHICLE

CROSS-REFERENCE TO RELATED APPLICATION

This application claims priority to and the benefit of Korean Patent Application No. 10-2023-0158986, filed in the Korean Intellectual Property Office on Nov. 16, 2023, the entire contents of which are incorporated herein by reference.

BACKGROUND

(a) Field

The present disclosure relates to a cabin cooling/heating system for a vehicle. More particularly, the present disclosure relates to a cabin cooling/heating system for a vehicle, which is capable of improving fast-acting cooling/heating properties and quickly reducing a cabin temperature difference.

(b) Description of the Related Art

In general, an air conditioning device for a vehicle refers to a device embedded in the vehicle and provided to cool or heat a vehicle cabin in summer or winter. Additionally, an air conditioning device for a vehicle may be provided to remove frost or the like formed on a windshield in rainy or wintery conditions to allow a driver to ensure a front/rear visual field.

The air conditioning device typically has both a heating system and a cooling system and cools or heats the vehicle cabin by selectively introducing outside air or inside air of the vehicle, heating or cooling the air, and then blowing the air into the vehicle cabin.

In general, the air conditioning device for a vehicle cools or heats the vehicle cabin by blowing cold air or warm air, which is generated by using a heat pump, into the vehicle cabin through an air vent. However, the air may not circulate smoothly because of various obstacles such as air vent positions, vehicle seats, and passengers, which may cause a significant temperature difference between cabin positions during an initial cooling/heating process. In particular, a temperature in a rear seat may vary significantly, reaching either very high or low levels.

In order to compensate for cabin temperature imbalance during the initial cooling/heating process described above, a seat, a crash pad, a door, and the like are equipped with heating wires, radiant warmers, thermoelectric elements, and the like. However, the heating wires, the radiant warmers, and the thermoelectric elements have low energy efficiency, which may increase electric power consumption and shorten a traveling distance of an environmentally friendly vehicle.

With the development of autonomous driving technology and the proliferation of purpose-built vehicles, vehicle cabins are increasingly used as office spaces, rest spaces, play spaces, and the like. Thus, a vehicle cabin space gradually increases.

Therefore, there is a rapidly increasing need to improve fast-acting cooling/heating properties of the vehicle and eliminate the cabin temperature imbalance during the initial cooling/heating process.

The above information disclosed in this Background section is only to enhance understanding of the background of the present disclosure. Therefore, the Background section may contain information that does not form the prior art that is already to a person of ordinary skill in the art.

SUMMARY

The present disclosure attempts to provide a cabin cooling/heating system for a vehicle, which is capable of implementing a function of cooling or heating a cabin floor of the vehicle by using an air conditioning device for cooling or heating a cabin. As a result, the system improves fast-acting cooling/heating properties and quickly uniformizes a cabin temperature.

According to the embodiment of the present disclosure, a cabin cooling/heating system for a vehicle is disclosed.

The vehicle includes a front cabin, a rear cabin, and a cabin floor that is a floor of the rear cabin inside the vehicle.

The cabin cooling/heating system may include a heat pump system configured to generate a cold refrigerant by expanding a refrigerant at one position and generate a hot refrigerant by compressing the refrigerant at another position. The cabin cooling/heating system may include an air conditioning device fluidly connected to the heat pump system and configured to receive the cold or hot refrigerant from the heat pump system, generate cold or warm air by heat exchange between inside air of the vehicle or outside air of the vehicle and the cold or hot refrigerant, and blow the cold or warm air into a front cabin of the vehicle. The cabin cooling/heating system may also include a floor heat exchanger mounted in a cabin floor of a rear cabin of the vehicle, fluidly connected to the air conditioning device, and configured to receive the cold or hot refrigerant from the air conditioning device, cool or heat the cabin floor by circulating the cold or hot refrigerant through the cabin floor, and return the cold or hot refrigerant, which has circulated through the cabin floor, back to the heat pump system. The cabin cooling/heating system may also include a line switching valve module disposed between the air conditioning device and the floor heat exchanger and configured to send the cold or hot refrigerant, which has passed through the air conditioning device, to the floor heat exchanger or send the cold or hot refrigerant to the heat pump system.

The heat pump system may include: an external heat exchanger configured to lower or raise a temperature of the refrigerant; and a first expansion valve configured to receive the refrigerant from the external heat exchanger, generate the cold refrigerant by expanding the refrigerant, and send either the cold refrigerant or the refrigerant without being expanded to the air conditioning device. The heat pump system may also include an accumulator configured to receive the refrigerant, which is not expanded, from the first expansion valve or receive the refrigerant that has passed through the air conditioning device and/or the floor heat exchanger. The accumulator may be configured to separate a liquid refrigerant and a gaseous refrigerant contained in the refrigerant. The heat pump system may also include at least one compressor configured to receive the refrigerant from the accumulator, generate the hot refrigerant by compressing the refrigerant, and send the hot refrigerant to the air conditioning device.

The heat pump system may further include a second expansion valve configured to receive the refrigerant from the air conditioning device or the floor heat exchanger, and return the refrigerant to the external heat exchanger after or without expanding the refrigerant.

The second expansion valve may expand the refrigerant and return the refrigerant to the external heat exchanger to heat the front cabin and/or the cabin floor. The second expansion valve may return the refrigerant to the external heat exchanger without expanding the refrigerant to cool the front cabin and/or the cabin floor.

The air conditioning device may include an air passageway configured to allow the inside air or outside air of the vehicle to communicate with the front cabin. The air passageway defines a passageway through which the inside air or the outside air flows to the front cabin. The air conditioning device may also include: an air blower configured to blow the inside air or the outside air into the air passageway; and an internal condenser disposed in the air passageway. The internal condenser may be connected to the at least one compressor, and configured to receive the hot refrigerant from the at least one compressor, heat the inside air or the outside air in the air passageway, and send the hot refrigerant to the line switching valve module. The air conditioning device may also include an internal evaporator disposed in the air passageway. The internal evaporator may be connected to the first expansion valve, and configured to receive the cold refrigerant from the first expansion valve, cool the inside air or the outside air in the air passageway, and send the cold refrigerant to the line switching valve module.

The air conditioning device may further include an air door configured to selectively open or close the air passageway through which the inside air or the outside air flows to the internal condenser.

The air door may open the air passageway, through which the inside air or the outside air flows to the internal condenser, to heat the front cabin and/or the cabin floor. The air door may close the air passageway, through which the inside air or the outside air flows to the internal condenser, to cool the front cabin and/or the cabin floor.

The line switching valve module may include a first line switching valve fluidly connected to the internal condenser and configured to receive the hot refrigerant from the internal condenser and selectively send the hot refrigerant to the floor heat exchanger or the second expansion valve. The line switching valve module may include a second line switching valve fluidly connected to the internal evaporator and configured to receive the cold refrigerant from the internal evaporator and selectively send the cold refrigerant to the floor heat exchanger or the accumulator.

The cabin cooling/heating system according to another embodiment of the present disclosure may include a heat pump system configured to generate a cold refrigerant by expanding a refrigerant at one position and generate a hot refrigerant by compressing the refrigerant at another position. The cabin cooling/heating system may also include an air conditioning device fluidly connected to the heat pump system and configured to receive the cold or hot refrigerant from the heat pump system, generate cold or warm air by heat exchange between inside air of the vehicle or outside air of the vehicle and the cold or hot refrigerant, and blow the cold or warm air into the front cabin of the vehicle. The cabin cooling/heating system may also include a second air conditioning device fluidly connected to the air conditioning device and configured to receive the cold or hot refrigerant from the air conditioning device, generate the cold or the warm air by heat exchange between the inside air or the outside air of the vehicle and the cold or hot refrigerant, and blow the cold or warm air into the rear cabin. The cabin cooling/heating system may also include a floor heat exchanger mounted in a cabin floor of the rear cabin of the vehicle. The floor heat exchanger may be fluidly connected to the second air conditioning device, and configured to receive the cold or hot refrigerant from the second air conditioning device, cool or heat the cabin floor by circulating the cold or hot refrigerant through the cabin floor, and return the cold or hot refrigerant, which has circulated through the cabin floor, back to the heat pump system. The cabin cooling/heating system may also include a line switching valve module disposed between the second air conditioning device and the floor heat exchanger and configured to send the cold or hot refrigerant, which has passed through the second air conditioning device, to the floor heat exchanger or send the cold or hot refrigerant to the heat pump system.

The heat pump system may include: an external heat exchanger configured to lower or raise a temperature of the refrigerant; and a first expansion valve configured to receive the refrigerant from the external heat exchanger. The first expansion valve may also be configured to generate the cold refrigerant by expanding the refrigerant and send either the cold refrigerant or the refrigerant without being expanded to the air conditioning device. The heat pump system may also include an accumulator configured to receive the refrigerant, which is not expanded, from the first expansion valve or receive the refrigerant that has passed through the air conditioning device, the second air conditioning device, and/or the floor heat exchanger. The accumulator may also be configured to separate a liquid refrigerant and a gaseous refrigerant contained in the refrigerant. The heat pump system may also include at least one compressor configured to receive the refrigerant from the accumulator, generate the hot refrigerant by compressing the refrigerant, and send the hot refrigerant to the air conditioning device.

The heat pump system may further include a second expansion valve configured to receive the refrigerant from the second air conditioning device or the floor heat exchanger and return the refrigerant to the external heat exchanger after or without expanding the refrigerant.

The second expansion valve may expand the refrigerant and return the refrigerant to the external heat exchanger to heat the front cabin and/or the cabin floor. The second expansion valve may also return the refrigerant to the external heat exchanger without expanding the refrigerant to cool the front cabin and/or the cabin floor.

The air conditioning device may include an air passageway configured to allow the inside air or the outside air of the vehicle to communicate with the front cabin. The air passageway may be configured to define a passageway through which the inside air or the outside air flows to the front cabin. The air conditioning device may also include an air blower configured to blow the inside air or the outside air into the air passageway. The air conditioning device may also include an internal condenser disposed in the air passageway, and connected to the at least one compressor. The internal condenser may be configured to receive the hot refrigerant from the at least one compressor, heat the inside air or the outside air in the air passageway, and send the hot refrigerant to the second air conditioning device. The air conditioning device may also include an internal evaporator disposed in the air passageway, and connected to the first expansion valve. The internal evaporator may be configured to receive the cold refrigerant from the first expansion valve, cool the inside air or the outside air in the air passageway, and send the cold refrigerant to the second air conditioning device.

The air conditioning device may further include an air door configured to selectively open or close the air passageway through which the inside air or the outside air flows to the internal condenser.

The second air conditioning device may include a second air passageway configured to allow the inside air or outside air of the vehicle to communicate with the rear cabin. The second air passageway may be configured to define a passageway through which the inside air or the outside air flows to the rear cabin. The second air conditioning device may include: a second air blower configured to blow the inside air or the outside air into the second air passageway; and a second internal condenser disposed in the second air passageway, and connected to the internal condenser. The second internal condenser may be configured to receive the hot refrigerant from the internal condenser, heat the inside air or the outside air in the second air passageway, and send the hot refrigerant to the line switching valve module. The second air conditioning device may further include a second internal evaporator disposed in the second air passageway, and connected to the internal evaporator. The second internal evaporator may be configured to receive the cold refrigerant from the internal evaporator, cool the inside air or the outside air in the second air passageway, and send the cold refrigerant to the line switching valve module.

The second air conditioning device may further include a second air door configured to selectively open or close the second air passageway through which the inside air or the outside air flows to the second internal condenser.

The air door may open the air passageway, through which the inside air or the outside air flows to the internal condenser, to heat the front cabin and/or the cabin floor by using the air conditioning device. The second air door may open the second air passageway, through which the inside air or the outside air flows to the second internal condenser, to heat the rear cabin and/or the cabin floor by using the second air conditioning device. Additionally, the air door may close the air passageway, through which the inside air or the outside air flows to the internal condenser, and the second air door may close the second air passageway, through which the inside air or the outside air flows to the second internal condenser, to cool both the front and rear cabin and/or the cabin floor.

The line switching valve module may include a first line switching valve fluidly connected to the second internal condenser and configured to receive the hot refrigerant from the second internal condenser and selectively send the hot refrigerant to the floor heat exchanger or the second expansion valve. The line switching valve module may include a second line switching valve fluidly connected to the second internal evaporator and configured to receive the cold refrigerant from the second internal evaporator and selectively send the cold refrigerant to the floor heat exchanger or the accumulator.

According to the present disclosure, the hot or cold refrigerant prepared by the heat pump system may be supplied to not only the air conditioning device for cooling or heating the cabin but also the heat exchanger for cooling or heating the cabin floor. As a result, simultaneous cooling or heating may be provided to the cabin by using the air conditioning device and cooling or heating the cabin floor by using the heat exchanger.

Therefore, it is possible to ensure the cooling/heating performance and the fast-acting properties.

In addition, it is possible to quickly uniformize the cabin temperature distribution by cooling or heating the cabin by using the air conditioning device and cooling or heating the cabin floor by using the heat exchanger.

Furthermore, it is possible to improve comfort in the cabin by cooling or heating the cabin floor and to expand the use of the cabin space.

In addition, the cooling or heating process may be implemented by the heat pump system, thereby improving energy efficiency. Therefore, the amount of electric power consumption may decrease, and the traveling distance may increase.

Other effects, which may be obtained or expected by the embodiments of the present disclosure, are directly or implicitly disclosed in the detailed description on the embodiments of the present disclosure. That is, various effects expected according to the embodiments of the present disclosure are disclosed in the detailed description described below.

BRIEF DESCRIPTION OF THE DRAWINGS

The embodiments in the present specification may be better understood with reference to the following description in conjunction with the accompanying drawings in which similar reference numerals indicate the same or functionally similar elements.

Figure 1:
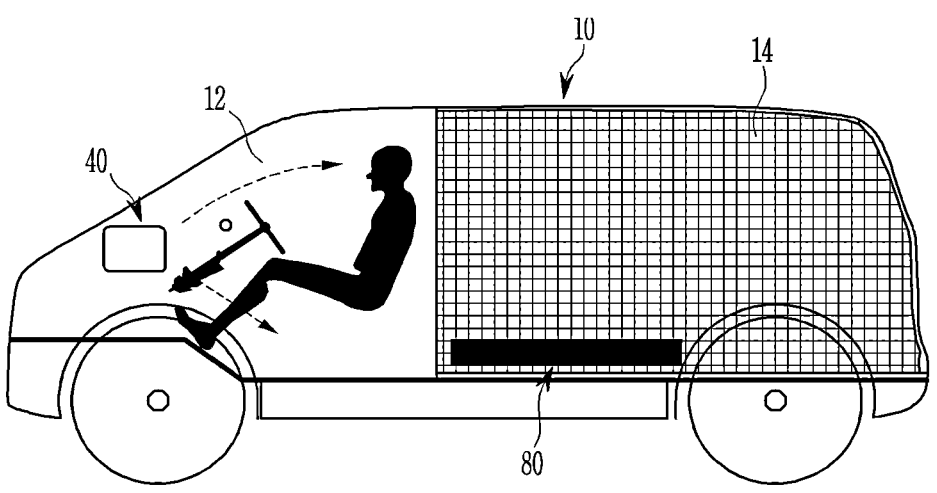
FIG. 1 is a schematic view of a vehicle equipped with a cabin cooling/heating system for a vehicle according to an embodiment of the present disclosure.

It should be understood that the accompanying drawings are not necessarily drawn to scale, but provide a somewhat simplified representation of various preferred features that exemplify the basic principles of the present disclosure. For example, specific design features of the present disclosure, including particular dimensions, directions, positions, and shapes, should be partially determined by the particularly intended application and use environment.

DETAILED DESCRIPTION

The terms used herein are merely for the purpose of describing a specific embodiment, and not intended to limit the present disclosure. The singular expressions used herein are intended to include the plural expressions unless the context clearly dictates otherwise. It should be understood that the terms "comprise (include)" and/or "comprising (including)" used in the present specification mean that the features, the integers, the steps, the operations, the constituent elements, and/or component are present. However, the presence or addition of one or more of other features, integers, steps, operations, constituent elements, components, and/or groups thereof is not excluded. The term "and/or" used herein includes any one or all of the combinations of listed related items.

It should be understood that the terms "vehicle," "of vehicle," or other similar terms as used herein are inclusive of motor vehicles in general. Such motor vehicles may include general land vehicles, passenger vehicles, sport utility vehicles (SUVs), buses, trucks, various commercial vehicles, and the like. Such motor vehicles may also include water craft having various boats and ships, aircraft having drones, and the like. Such motor vehicles may also include any object capable of moving by receiving power from a power source. Further, as used in the present specification, the terms "vehicle," "of vehicle," or similar terms are understood as including hybrid vehicles, electric vehicles, plug-in hybrid vehicles, hydrogen-powered vehicles, and vehicles using alternative fuel (e.g., fuel derived from sources other than petroleum). As referenced in the present specification, a hybrid vehicle includes a vehicle having two or more power sources, such as a vehicle that is both gasoline-powered and electric-powered. The vehicle according to the embodiment of the present disclosure includes not only a vehicle that is operated manually, but also a vehicle that is somewhat autonomously and/or automatically operated.

In addition, it should be understood that one or more of the following methods or aspects thereof may be carried out by at least one controller. The term "controller" may refer to a hardware device including a memory and a processor. The memory is configured to store program instructions, and the processor is specially programmed to execute the program instructions to perform one or more processes described below in more detail. The controller may control operations of units, modules, components, devices, or the like, as described herein. In addition, it should be understood that the following methods may be carried out by an apparatus including the controller as well as one or more other components, as recognized by those having ordinary skill in the art. When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

In addition, the controller of the present disclosure may be implemented as a non-transitory computer-readable recording medium containing executable program instructions executed by a processor. Examples of the computer-readable recording media include, but are not limited to, read-only memory (ROM), random access memory (RAM), compact disc (CD)-ROM, magnetic tape, floppy disk, flash drive, smart card, and optical data storage device. The computer-readable recording medium can also be distributed in an overall computer network so that the program instruction may be stored and executed in a distributed manner, e.g., by a telematics server or a controller area network (CAN).

Hereinafter, the embodiments of the present disclosure are described in detail with reference to the accompanying drawings.

FIG. 1 is a schematic view of a vehicle (e.g., mobility) equipped with a cabin cooling/heating system for a vehicle according to an embodiment of the present disclosure.

As illustrated in FIG. 1, a vehicle 10 equipped with a cabin cooling/heating system for a vehicle according to an embodiment of the present disclosure includes a cabin in which occupants may be positioned. The cabin includes a front cabin 12 and a rear cabin 14. The front cabin 12 is provided at a front portion of the vehicle, and a driver seat and a passenger seat are positioned in the front cabin 12. The rear cabin 14 is provided at a rear portion of the vehicle, and rear seats are positioned in the rear cabin 14. The front cabin 12 and the rear cabin 14 may be separated by various means. As an example, the front cabin 12 and the rear cabin 14 may be separated by the backrests of the front seats.

Figure 2:
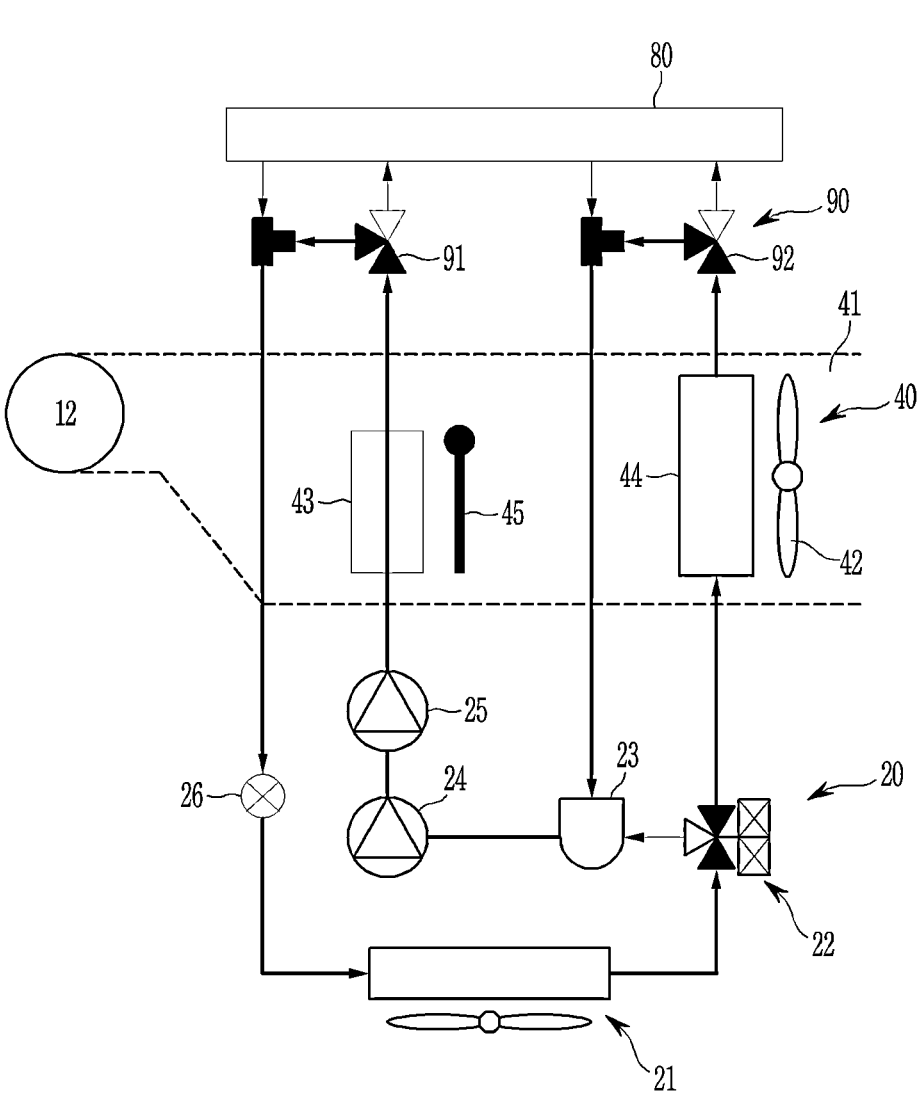
FIG. 2 is a diagram illustrating a vehicle including an air conditioning device of a cabin cooling/heating system to cool a cabin of the vehicle according to an embodiment of the present disclosure.
Figure 3:
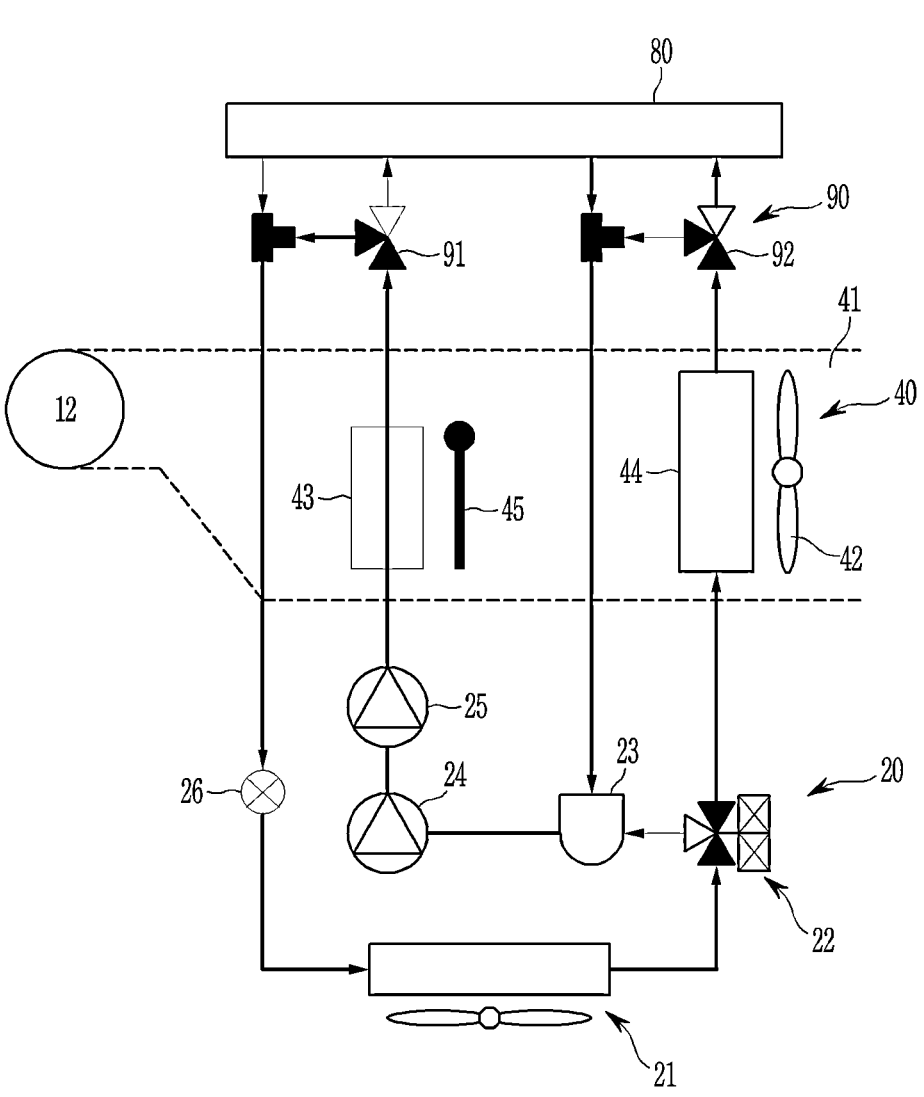
FIG. 3 is a diagram illustrating the configuration of cooling a cabin and a cabin floor using an air conditioning device of a cabin cooling/heating system for a vehicle and a floor heat exchanger, according to an embodiment of the present disclosure.
Figure 4:
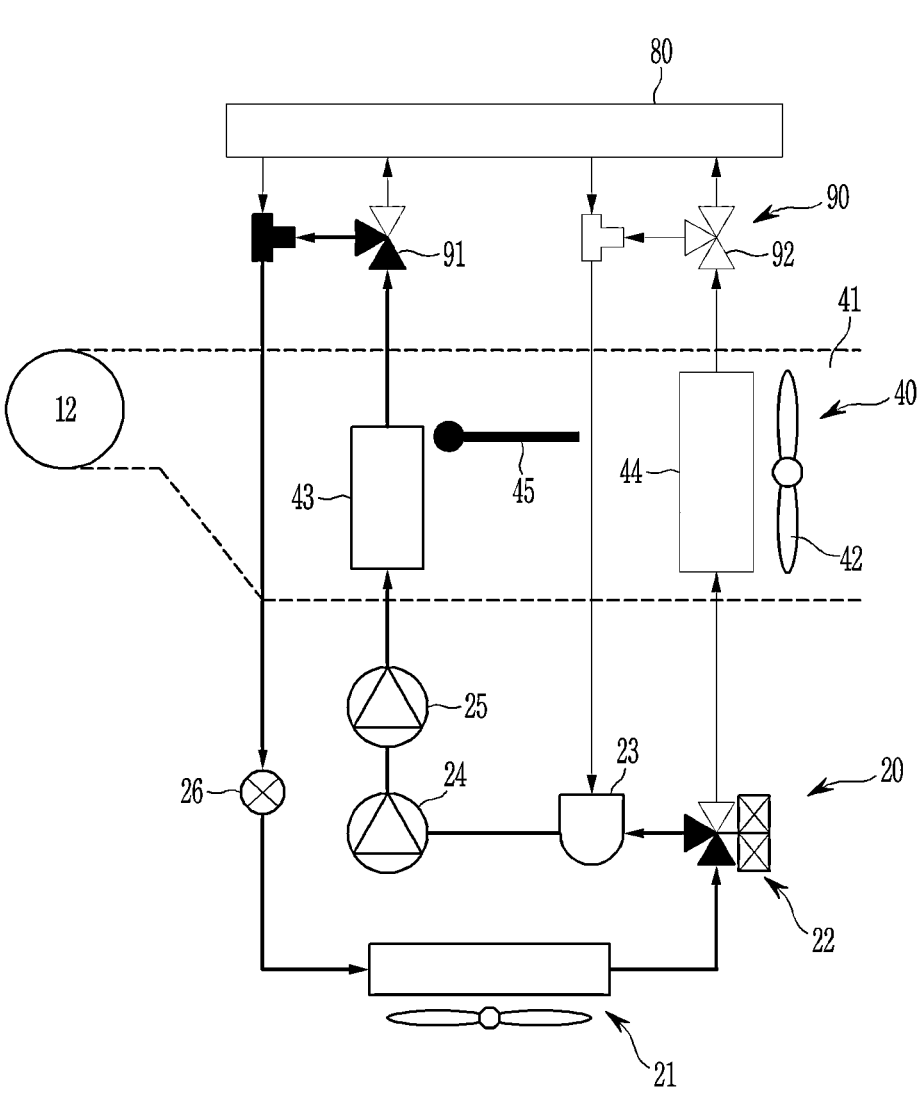
FIG. 4 is a diagram illustrating the configuration of heating a cabin using an air conditioning device of a cabin cooling/heating system for a vehicle according to an embodiment of the present disclosure.
Figure 5:
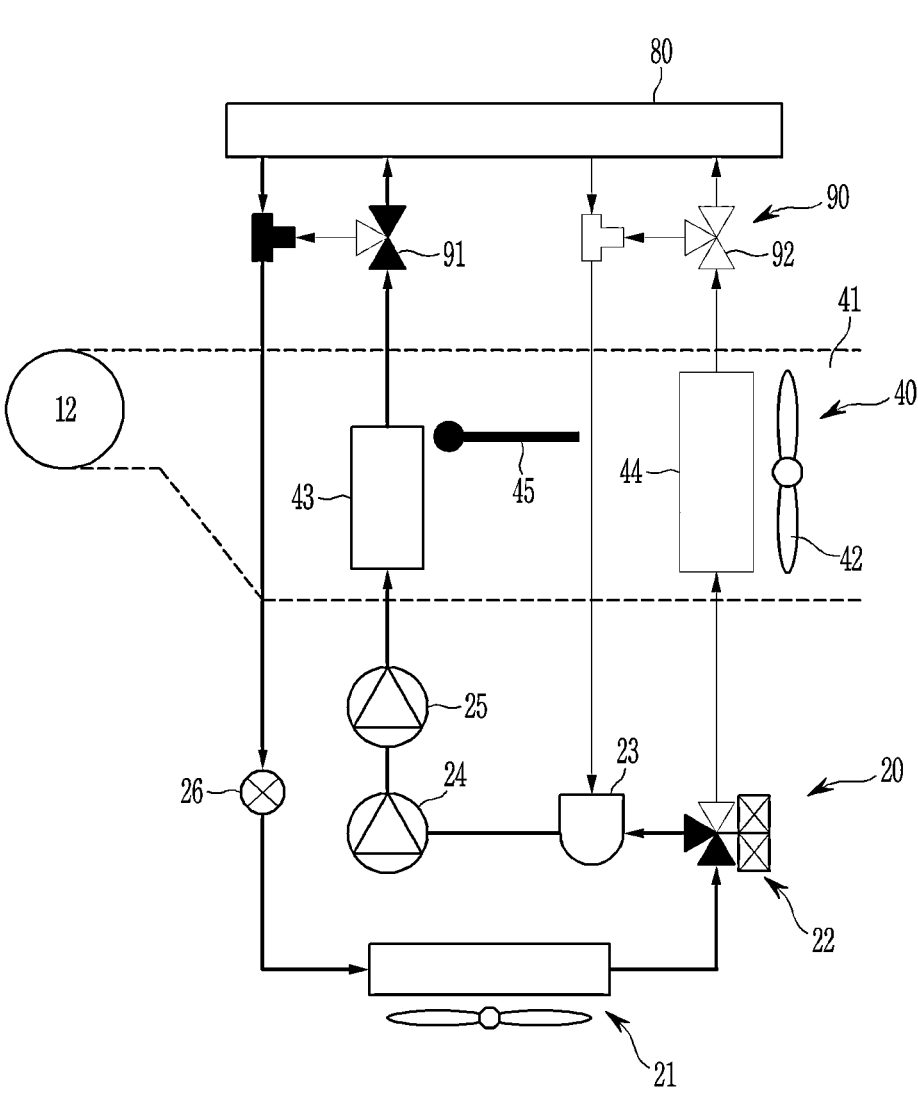
FIG. 5 is a diagram illustrating the configuration of heating a cabin and a cabin floor using an air conditioning device of a cabin cooling/heating system for a vehicle and a floor heat exchanger, according to an embodiment of the present disclosure.

FIG. 2 is a diagram illustrating a case in which an air conditioning device of a cabin cooling/heating system for a vehicle according to an embodiment of the present disclosure is used to cool a cabin. FIG. 3 is a diagram illustrating a case in which an air conditioning device of a cabin cooling/heating system for a vehicle is used to cool the cabin and a floor heat exchanger is used to cool a cabin floor according to an embodiment of the present disclosure. FIG. 4 is a diagram illustrating a case in which an air conditioning device of a cabin cooling/heating system for a vehicle according to an embodiment of the present disclosure is used to heat a cabin. FIG. 5 is a diagram illustrating a case in which an air conditioning device of a cabin cooling/heating system for a vehicle is used to heat a cabin and a floor heat exchanger is used to heat a cabin floor according to an embodiment of the present disclosure.

According to an embodiment of the present disclosure, as illustrated in FIGS. 2 to 5, the cabin cooling/heating system for a vehicle includes a heat pump system 20, an air conditioning device 40, and a floor heat exchanger 80.

The heat pump system 20 is configured to generate a cold refrigerant by expanding a refrigerant at one position, generate a hot refrigerant by compressing the refrigerant at another position, and send the generated cold or hot refrigerant to the air conditioning device 40. The heat pump system 20 may include an external heat exchanger 21, a first expansion valve 22, an accumulator 23, first and second compressors 24 and 25, and a second expansion valve 26.

The external heat exchanger 21 lowers or raises a temperature of the refrigerant by blowing air at the refrigerant and sends the refrigerant to the first expansion valve 22. The external heat exchanger 21 may be, but not limited to, an air-cooled heat exchanger.

The first expansion valve 22 receives the refrigerant from the external heat exchanger 21. The first expansion valve 22 may lower the temperature of the refrigerant (generate the cold refrigerant) by expanding the refrigerant and send the cold refrigerant to the air conditioning device 40. Alternatively, the first expansion valve 22 may send the refrigerant to the accumulator 23 without expanding the refrigerant. More specifically, in order to cool the cabin or the cabin floor, the first expansion valve 22 generates the cold refrigerant by expanding the refrigerant and sends the cold refrigerant to the air conditioning device 40. Therefore, the low-temperature cold refrigerant may be used to cool the cabin and/or the cabin floor. On the contrary, in order to heat the cabin or the cabin floor, the first expansion valve 22 sends the refrigerant to the accumulator 23 without expanding the refrigerant. Therefore, the hot refrigerant may be easily generated from the refrigerant by the first and second compressors 24 and 25 without excessive work.

The accumulator 23 receives the refrigerant, which is not expanded by the first expansion valve 22, or receives the refrigerant having passed through the air conditioning device 40 and/or the floor heat exchanger 80. The accumulator 23 removes moisture from the refrigerant, separates a liquid refrigerant and a gaseous refrigerant contained in the refrigerant, and sends the gaseous refrigerant to the first compressor 24.

The first and second compressors 24 and 25 receive the refrigerant from the accumulator 23 and raise the temperature of the refrigerant (generate the hot refrigerant) by compressing the refrigerant. The first and second compressors 24 and 25 send the hot refrigerant to the air conditioning device 40. More specifically, the first compressor 24 receives the refrigerant from the accumulator 23 and raises the temperature of the refrigerant by primarily compressing the refrigerant. The second compressor 25 receives the refrigerant with the raised temperature from the first compressor 24 and further raises the temperature of the refrigerant by compressing the refrigerant again. The second compressor 25 sends the refrigerant (hot refrigerant) with the raised temperature to the air conditioning device 40. In the present specification, the example is described in which the two compressors are used to compress the refrigerant. However, the number of compressors to be used is not limited thereto. One compressor or three or more compressors may be used.

The second expansion valve 26 receives the refrigerant from the air conditioning device 40 and sends the refrigerant to the external heat exchanger 21 with or without expanding the refrigerant. More specifically, in order to cool the cabin or the cabin floor, the second expansion valve 26 sends the refrigerant to the external heat exchanger 21 without expanding the refrigerant. In other words, because the temperature of the refrigerant introduced into the second expansion valve 26 is low at the time of cooling the cabin or the cabin floor, a target temperature of the refrigerant to be supplied to the first expansion valve 26 may be achieved by an operation of the external heat exchanger 21 without further lowering the temperature of the refrigerant. On the contrary, in order to heat the cabin or the cabin floor, the second expansion valve 26 lowers the temperature of the refrigerant by expanding the refrigerant and sends the refrigerant with the lowered temperature to the external heat exchanger 21. In other words, because the temperature of the refrigerant introduced into the second expansion valve 26 is high at the time of heating the cabin or the cabin floor, the second expansion valve 26 lowers the temperature of the refrigerant by expanding the refrigerant and then sends the refrigerant to the external heat exchanger 21. In this case, the external heat exchanger 21 operates as an evaporator.

The air conditioning device 40 is fluidly connected to the heat pump system 20 and receives the cold or hot refrigerant generated by the heat pump system 20. The air conditioning device 40 generates cold or warm air by heat exchange between the cold refrigerant and air or between the hot refrigerant and air. As illustrated in FIG. 1, at least a part of the air conditioning device 40 is mounted in the front cabin 12 and configured to cool or heat the cabin, particularly the front cabin 12 by blowing the generated cold or warm air into the front cabin. The air conditioning device 40 sends the cold or hot refrigerant, which has exchanged heat with the air, to the floor heat exchanger 80.

The air conditioning device 40 includes an air passageway 41, an internal condenser 43, and an internal evaporator 44 disposed in the air passageway 41.

The air passageway 41 allows the inside air or outside air of the vehicle 10 to communicate with the front cabin 12 so that inside air or outside air of the vehicle 10 flows to the front cabin 12. More specifically, an inlet of the air passageway 41 communicates with the inside air or outside air of the vehicle 10, and an outlet of the air passageway 41 is mounted in the front cabin 12 and communicates with the front cabin 12. An air blower 42 is disposed in the air passageway 41 and blows the inside air or the outside air into the air passageway 41. The drawing illustrates that the air blower 42 is disposed at an upstream side of the internal evaporator 44 (i.e., the inlet of the air passageway 41). However, the position of the air blower 42 is not limited thereto. The air blower 42 may be disposed at any position at which the air blower 42 may send the inside air or the outside air to the front cabin 12 through the air passageway 41.

The internal condenser 43 is disposed in the air passageway 41 and configured to generate the warm air by heating the inside air or the outside air passing through the internal condenser 43. Additionally, the internal condenser 43 is configured to supply the generated warm air into the cabin, particularly the front cabin 12 to heat the cabin. The internal condenser 43 is connected to the second compressor 25, receives the hot refrigerant from the second compressor 25, and heats the inside air or the outside air, which passes through the internal condenser 43, by using the hot refrigerant. An air door 45 is mounted in the air passageway 41 through which the inside air or the outside air flows toward the internal condenser 43 from the inside or outside of the vehicle 10. The air door 45 selectively opens or closes the air passageway 41 through which the inside air or the outside air flows toward the internal condenser 43. In other words, the air door 45 closes the air passageway 41, through which the inside air or the outside air flows toward the internal condenser 43, to prevent the inside air or the outside air from passing through the internal condenser 43. Alternatively, the air door 45 opens the air passageway 41, through which the inside air or the outside air flows toward the internal condenser 43, to allow the inside air or the outside air to pass through the internal condenser 43. Therefore, the inside air or the outside air is heated by the internal condenser 43 when the air door 45 opens the air passageway 41. The inside air or the outside air is not heated by the internal condenser 43 when the air door 45 closes the air passageway 41. The hot refrigerant, which has circulated through the internal condenser 43, flows toward the floor heat exchanger 80.

The internal evaporator 44 is disposed in the air passageway 41 and configured to generate cold air by cooling the inside air or the outside air passing through the internal evaporator 44. Additionally, the internal evaporator 44 is configured to supply the generated cold air into the cabin, particularly the front cabin 12 to cool the cabin. The internal evaporator 44 is connected to the first expansion valve 22, receives the cold refrigerant from the first expansion valve 22, and cools the inside air or the outside air, which passes through the internal evaporator 44, by evaporating the cold refrigerant. The cold refrigerant, which has circulated through the internal evaporator 44, flows toward the floor heat exchanger 80.

The floor heat exchanger 80 is fluidly connected to the air conditioning device 40 and configured to receive the cold or hot refrigerant from the air conditioning device 40. As illustrated in FIG. 1, the floor heat exchanger 80 is mounted in the cabin floor of the rear cabin 14 and configured to cool or heat the cabin floor of the rear cabin 14 by circulating the cold or hot refrigerant, which is received from the air conditioning device 40, through the cabin floor. For example, the floor heat exchanger 80 may be a refrigerant pipe uniformly embedded in the cabin floor of the rear cabin 14. In this case, the floor heat exchanger 80 is mounted in the cabin floor of the rear cabin 14. However, a position of the floor heat exchanger 80 is not limited thereto. The floor heat exchanger 80 may be mounted in at least one of the cabin floor of the front cabin 12 and the cabin floor of the rear cabin 14 and cool or heat the cabin floor. The floor heat exchanger 80 returns the cold or hot refrigerant, which has circulated through the floor heat exchanger 80, to the heat pump system 20. More specifically, the cold refrigerant, which has circulated through the floor heat exchanger 80, flows to the accumulator 23 of the heat pump system 20, and the hot refrigerant, which has circulated through the floor heat exchanger 80, flows to the second expansion valve 26 of the heat pump system 20.

The cabin cooling/heating system for a vehicle further includes a line switching valve module 90. The line switching valve module 90 is disposed between the air conditioning device 40 and the floor heat exchanger 80. The line switching module 90 is configured to send the cold or hot refrigerant from the air conditioning device 40 to the floor heat exchanger 80 or return the cold or hot refrigerant to the heat pump system 20. In other words, the line switching valve module 90 selectively and fluidly connects the air conditioning device 40 to the floor heat exchanger 80 or the heat pump system 20. Therefore, the cold or hot refrigerant in the air conditioning device 40 may return to the heat pump system 20 while passing through the floor heat exchanger 80 or return to the heat pump system 20 without passing through the floor heat exchanger 80, depending on a switching operation of the line switching valve module 90.

More specifically, the line switching valve module 90 includes a first line switching valve 91 and a second line switching valve 92. The first line switching valve 91 is fluidly connected to the internal condenser 43, such that the hot refrigerant, which has passed through the internal condenser 43, flows to the first line switching valve 91. The first line switching valve 91 is selectively connected to the floor heat exchanger 80 or the second expansion valve 26 of the heat pump system 20, such that the hot refrigerant selectively flows to the floor heat exchanger 80 or the second expansion valve 26 of the heat pump system 20. The second line switching valve 92 is fluidly connected to the internal evaporator 44, such that the cold refrigerant, which has passed through the internal evaporator 44, flows to the second line switching valve 92. The second line switching valve 92 is selectively connected to the floor heat exchanger 80 or the accumulator 23 of the heat pump system 20, such that the cold refrigerant selectively flows to the floor heat exchanger 80 or the accumulator 23 of the heat pump system 20.

As illustrated in FIG. 2, in order to cool the cabin by using the air conditioning device 40 of the cabin cooling/heating system for a vehicle, the external heat exchanger 21 of the heat pump system 20 cools the refrigerant by heat exchange between the refrigerant and the air and sends the cooled refrigerant to the first expansion valve 22. The first expansion valve 22 generates the cold refrigerant by expanding the refrigerant and sends the cold refrigerant to the internal evaporator 44 of the air conditioning device 40. In this case, the air blower 42 disposed in the air passageway 41 blows the inside air or the outside air to the internal evaporator 44 so that the inside air or the outside air exchanges heat with the cold refrigerant passing through the internal evaporator 44. In addition, the air door 45 closes the air passageway 41 directed toward the internal condenser 43 so that the inside air or the outside air does not pass through the internal condenser 43. Therefore, the cold air is generated, and the cold air is blown to the front cabin 12 through the outlet of the air passageway 41 disposed in the front cabin 12, thereby cooling the cabin.

The cold refrigerant, which has passed through the internal evaporator 44, flows to the second line switching valve 92, and the second line switching valve 92 sends the cold refrigerant to the accumulator 23 of the heat pump system 20. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 compress the refrigerant and send the compressed refrigerant to the internal condenser 43. However, the air door 45 closes the air passageway 41 directed toward the internal condenser 43, such that the inside air or the outside air or the cold air is not heated by the refrigerant passing through the internal condenser 43.

The refrigerant, which has passed through the internal condenser 43, flows to the first line switching valve 91, and the first line switching valve 91 sends the refrigerant to the second expansion valve 26 of the heat pump system 20. However, the second expansion valve 26 returns the refrigerant back to the external heat exchanger 21 without expanding the refrigerant.

As illustrated in FIG. 3, in order to cool the cabin by using the air conditioning device 40 of the cabin cooling/heating system for a vehicle and cool the cabin floor by using the floor heat exchanger 80, the external heat exchanger 21 of the heat pump system 20 cools the refrigerant by heat exchange between the refrigerant and the air and sends the cooled refrigerant to the first expansion valve 22. The first expansion valve 22 generates the cold refrigerant by expanding the refrigerant and sends the cold refrigerant to the internal evaporator 44 of the air conditioning device 40. In this case, the air blower 42 disposed in the air passageway 41 blows the inside air or the outside air to the internal evaporator 44 so that the inside air or the outside air exchanges heat with the cold refrigerant passing through the internal evaporator 44. In addition, the air door 45 closes the air passageway 41 directed toward the internal condenser 43 so that the inside air or the outside air does not pass through the internal condenser 43. Therefore, the cold air is generated, and the cold air is blown to the front cabin 12 through the outlet of the air passageway 41 disposed in the front cabin 12, thereby cooling the cabin.

The cold refrigerant, which has passed through the internal evaporator 44, flows to the second line switching valve 92, and the second line switching valve 92 sends the cold refrigerant to the floor heat exchanger 80. The cold refrigerant cools the cabin floor while circulating through the floor heat exchanger 80 and flows to the accumulator 23 of the heat pump system 20. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 compress the refrigerant and send the compressed refrigerant to the internal condenser 43. However, the air door 45 closes the air passageway 41 directed toward the internal condenser 43, such that the inside air or the outside air or the cold air is not heated by the refrigerant passing through the internal condenser 43.

The refrigerant, which has passed through the internal condenser 43, flows to the first line switching valve 91, and the first line switching valve 91 sends the refrigerant to the second expansion valve 26 of the heat pump system 20. However, the second expansion valve 26 returns the refrigerant back to the external heat exchanger 21 without expanding the refrigerant.

As illustrated in FIG. 4, in order to heat the cabin by using the air conditioning device 40 of the cabin cooling/heating system for a vehicle, the external heat exchanger 21 of the heat pump system 20 absorbs heat from the outside air, evaporates the refrigerant expanded in the second expansion valve 26, and then sends the refrigerant to the first expansion valve 22. The first expansion valve 22 sends the refrigerant to the accumulator 23 without expanding the refrigerant. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 generate the hot refrigerant by compressing the refrigerant and send the hot refrigerant to the internal condenser 43. In this case, the air blower 42 disposed in the air passageway 41 blows the inside air or the outside air toward the internal condenser 43. The air door 45 opens the air passageway 41 directed toward the internal condenser 43, such that the inside air or the outside air is heated while exchanging heat with the hot refrigerant passing through the internal condenser 43. In addition, the inside air or the outside air passes through the internal evaporator 44 disposed in the air passageway 41, but the inside air or the outside air is not cooled because the refrigerant does not flow through the internal evaporator 44. Therefore, the warm air is generated, and the warm air is blown to the front cabin 12 through the outlet of the air passageway 41 disposed in the front cabin 12, thereby heating the cabin.

The hot refrigerant, which has passed through the internal condenser 43, flows to the first line switching valve 91, and the first line switching valve 91 sends the hot refrigerant to the second expansion valve 26 of the heat pump system 20. The second expansion valve 26 expands the refrigerant and returns the expanded refrigerant back to the external heat exchanger 21.

As illustrated in FIG. 5, in order to heat the cabin by using the air conditioning device 40 of the cabin cooling/heating system for a vehicle and heat the cabin floor by using the floor heat exchanger 80, the external heat exchanger 21 of the heat pump system 20 absorbs heat from the outside air, evaporates the refrigerant expanded in the second expansion valve 26, and then sends the refrigerant to the first expansion valve 22. The first expansion valve 22 sends the refrigerant to the accumulator 23 without expanding the refrigerant. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 generate the hot refrigerant by compressing the refrigerant and send the hot refrigerant to the internal condenser 43. In this case, the air blower 42 disposed in the air passageway 41 blows the inside air or the outside air toward the internal condenser 43. The air door 45 opens the air passageway 41 directed toward the internal condenser 43, such that the inside air or the outside air is heated while exchanging heat with the hot refrigerant passing through the internal condenser 43. In addition, the inside air or the outside air passes through the internal evaporator 44 disposed in the air passageway 41, but the inside air or the outside air is not cooled because the refrigerant does not flow through the internal evaporator 44. Therefore, the warm air is generated, and the warm air is blown to the front cabin 12 through the outlet of the air passageway 41 disposed in the front cabin 12, thereby heating the cabin.

The hot refrigerant, which has passed through the internal condenser 43, flows to the first line switching valve 91, and the first line switching valve 91 sends the hot refrigerant to the floor heat exchanger 80. The hot refrigerant heats the cabin floor while circulating through the floor heat exchanger 80 and flows to the second expansion valve 26 of the heat pump system 20. The second expansion valve 26 expands the refrigerant and returns the expanded refrigerant back to the external heat exchanger 21.

Figure 6:
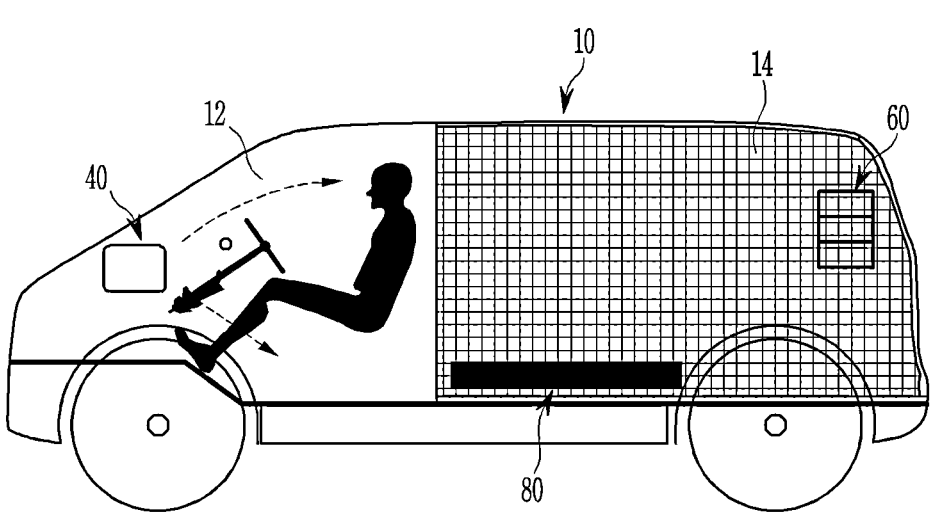
FIG. 6 is a schematic view of a vehicle equipped with a cabin cooling/heating system for a vehicle according to another embodiment of the present disclosure.

FIG. 6 is a schematic view of a vehicle equipped with a cabin cooling/heating system for a vehicle according to another embodiment of the present disclosure.

As illustrated in FIG. 6, the vehicle 10 that is equipped with a cabin cooling/heating system for a vehicle according to another embodiment of the present disclosure includes the cabin in which occupants may be positioned. The cabin includes the front cabin 12 and the rear cabin 14.

At least a part of the air conditioning device 40 is disposed in the front cabin 12, and at least a part of the air conditioning device 40 cools or heats the cabin by blowing the cold or warm air into the front cabin 12. The floor heat exchanger 80 is mounted in the cabin floor of the rear cabin 14, and the floor heat exchanger 80 cools or heats the cabin floor by using the cold or hot refrigerant that circulates through the floor heat exchanger 80. In addition, at least a part of a second air conditioning device 60 is mounted in the rear cabin 14, and at least a part of the second air conditioning device 60 cools or heats the cabin by blowing the cold or warm air into the rear cabin 14.

Figure 7:
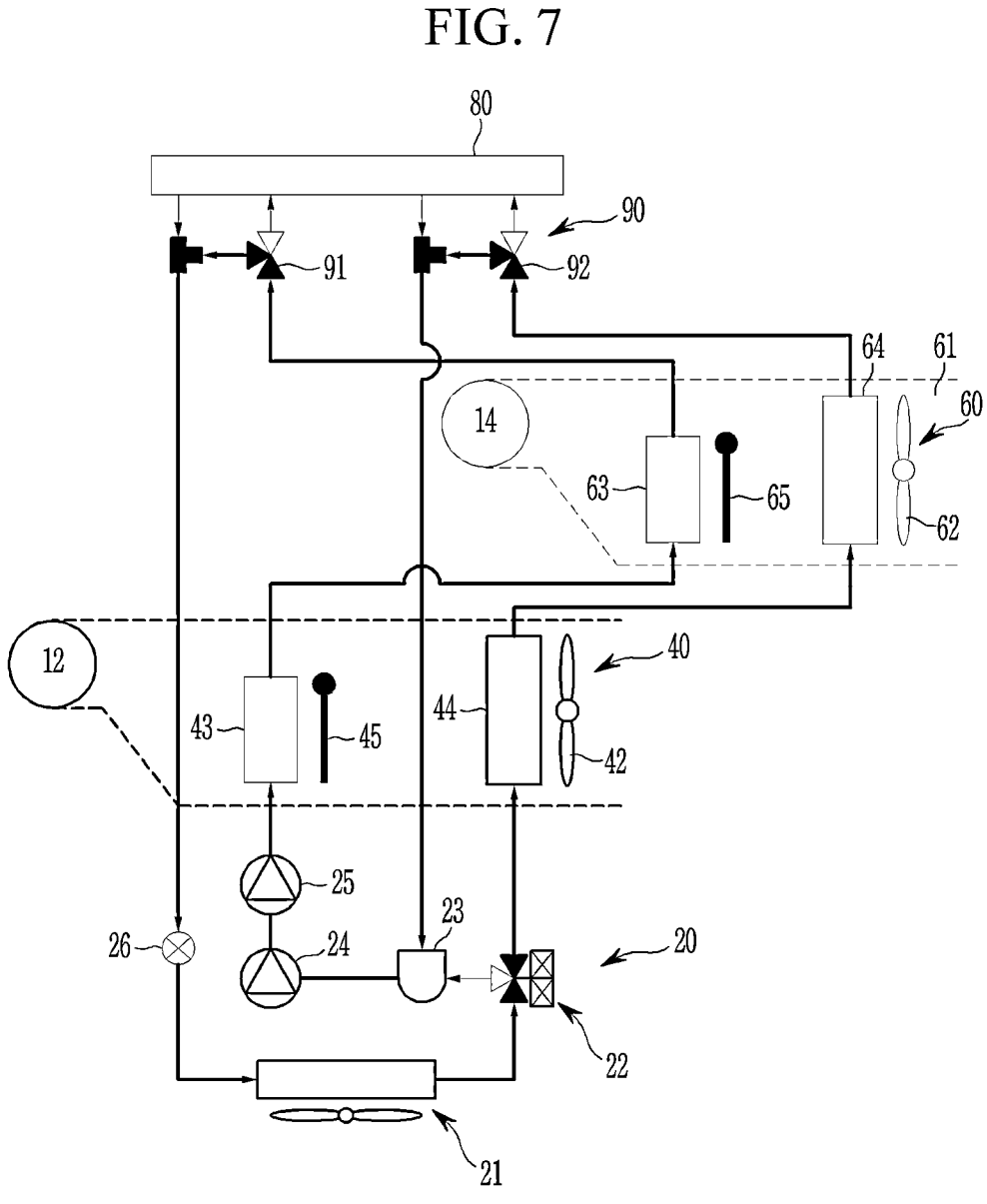
FIG. 7 is a diagram illustrating the configuration of cooling a cabin using an air conditioning device of a cabin cooling/heating system for a vehicle according to another embodiment of the present disclosure.
Figure 8:
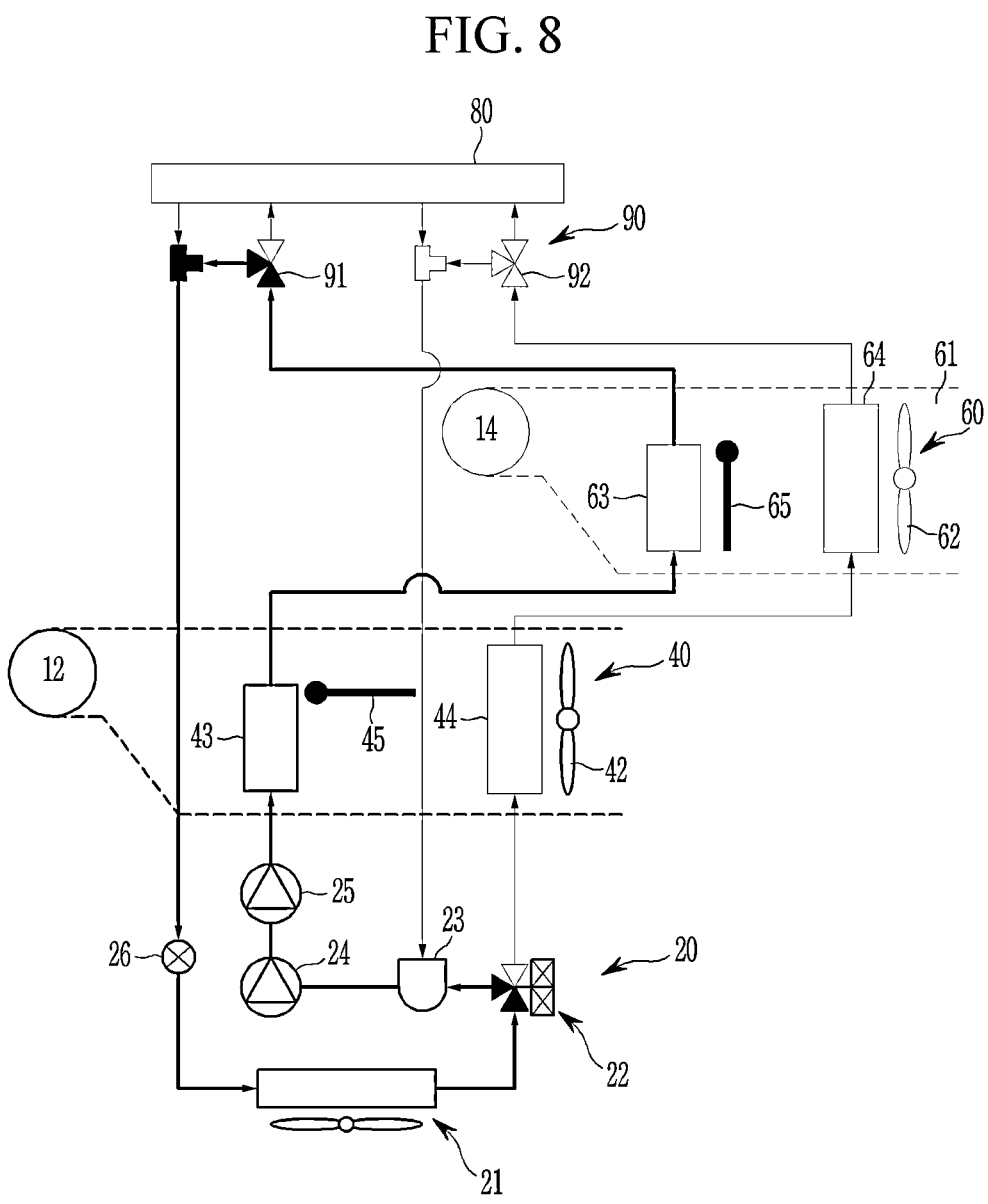
FIG. 8 is a diagram illustrating the configuration of heating a cabin using an air conditioning device of a cabin cooling/heating system for a vehicle according to another embodiment of the present disclosure.
Figure 9:
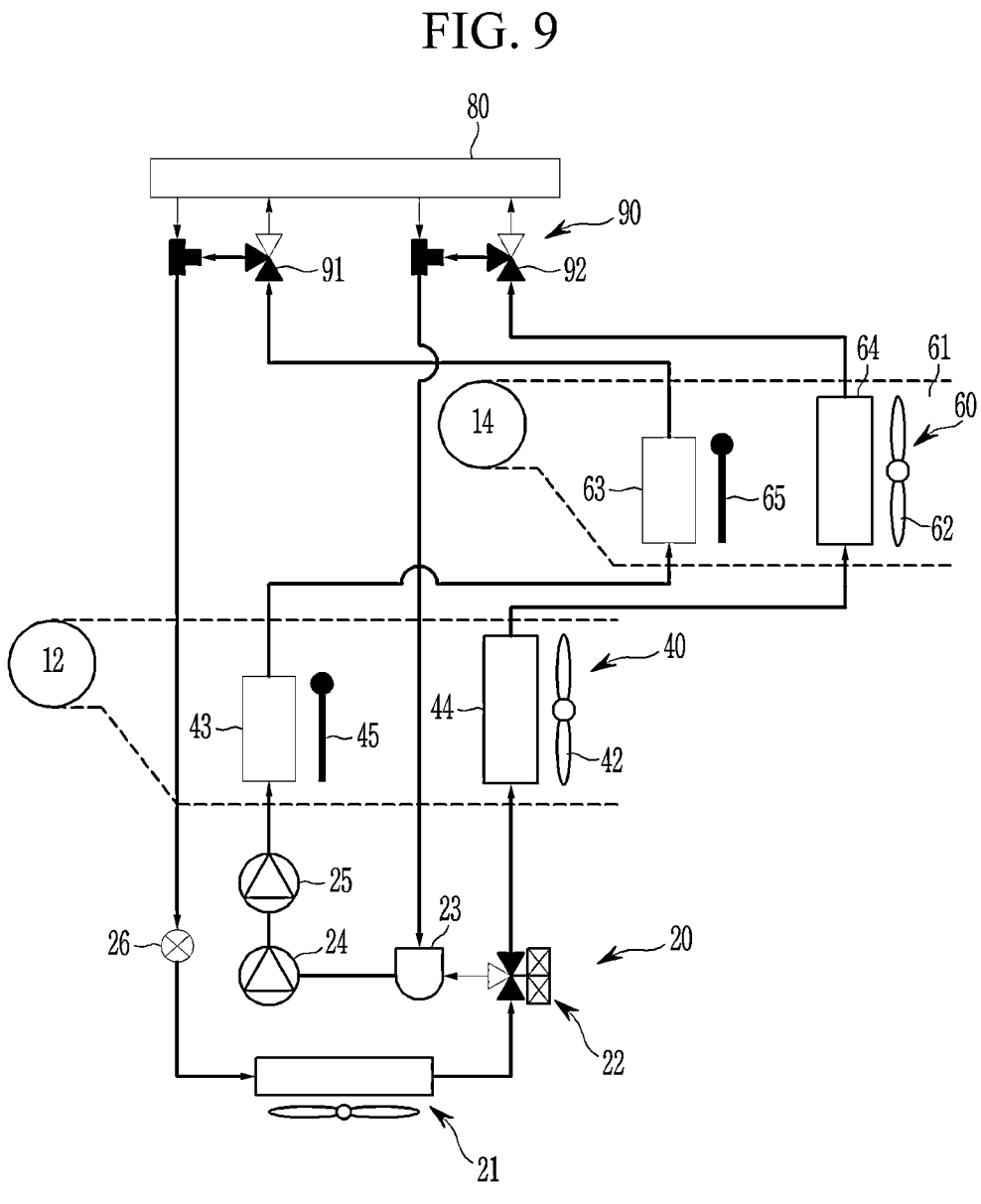
FIG. 9 is a diagram illustrating the configuration of cooling a cabin using an air conditioning device and a second air conditioning device of a cabin cooling/heating system for a vehicle according to another embodiment of the present disclosure.
Figure 10:
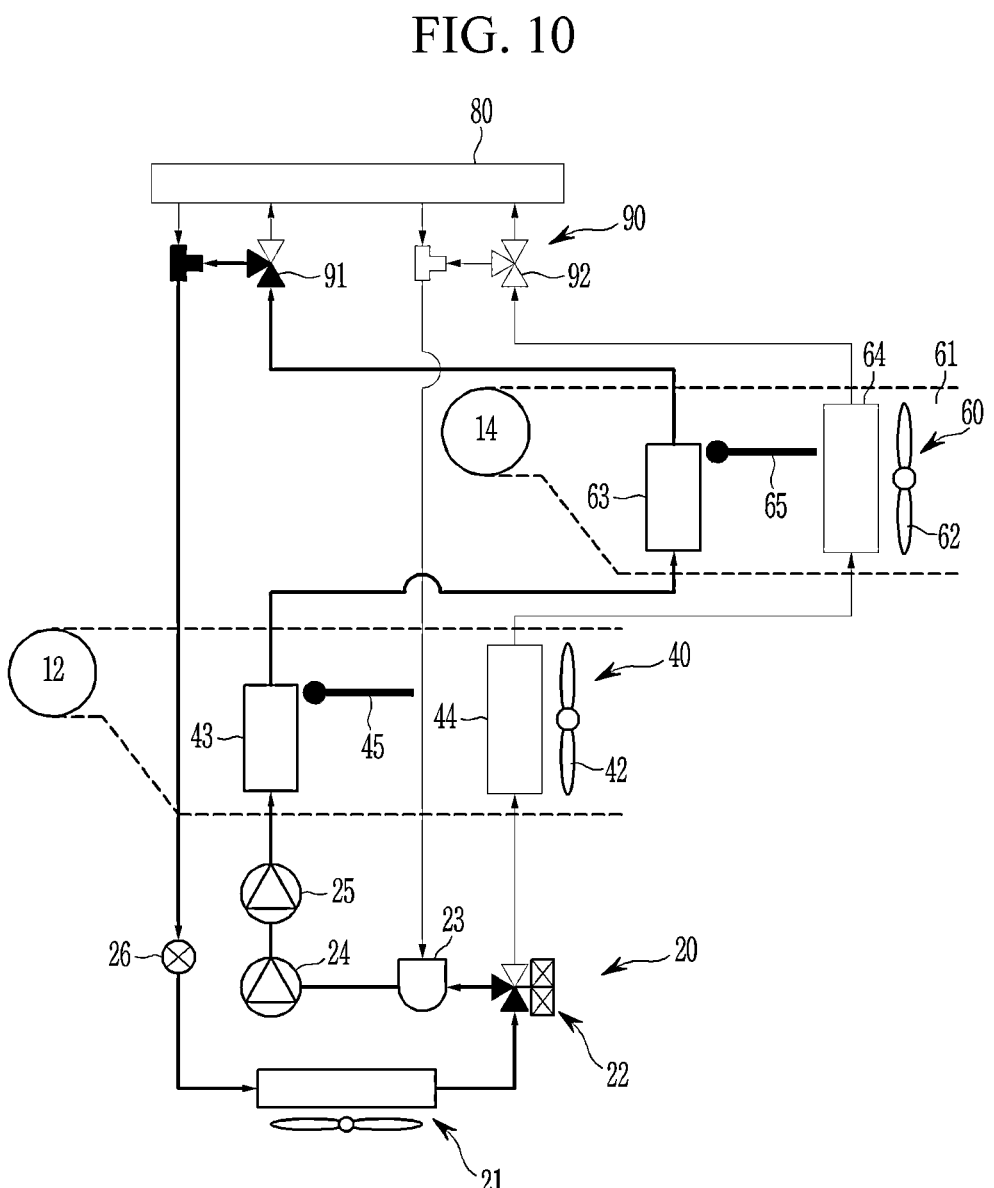
FIG. 10 is a diagram illustrating the configuration of heating a cabin using an air conditioning device and a second air conditioning device of a cabin cooling/heating system for a vehicle according to another embodiment of the present disclosure.
Figure 11:
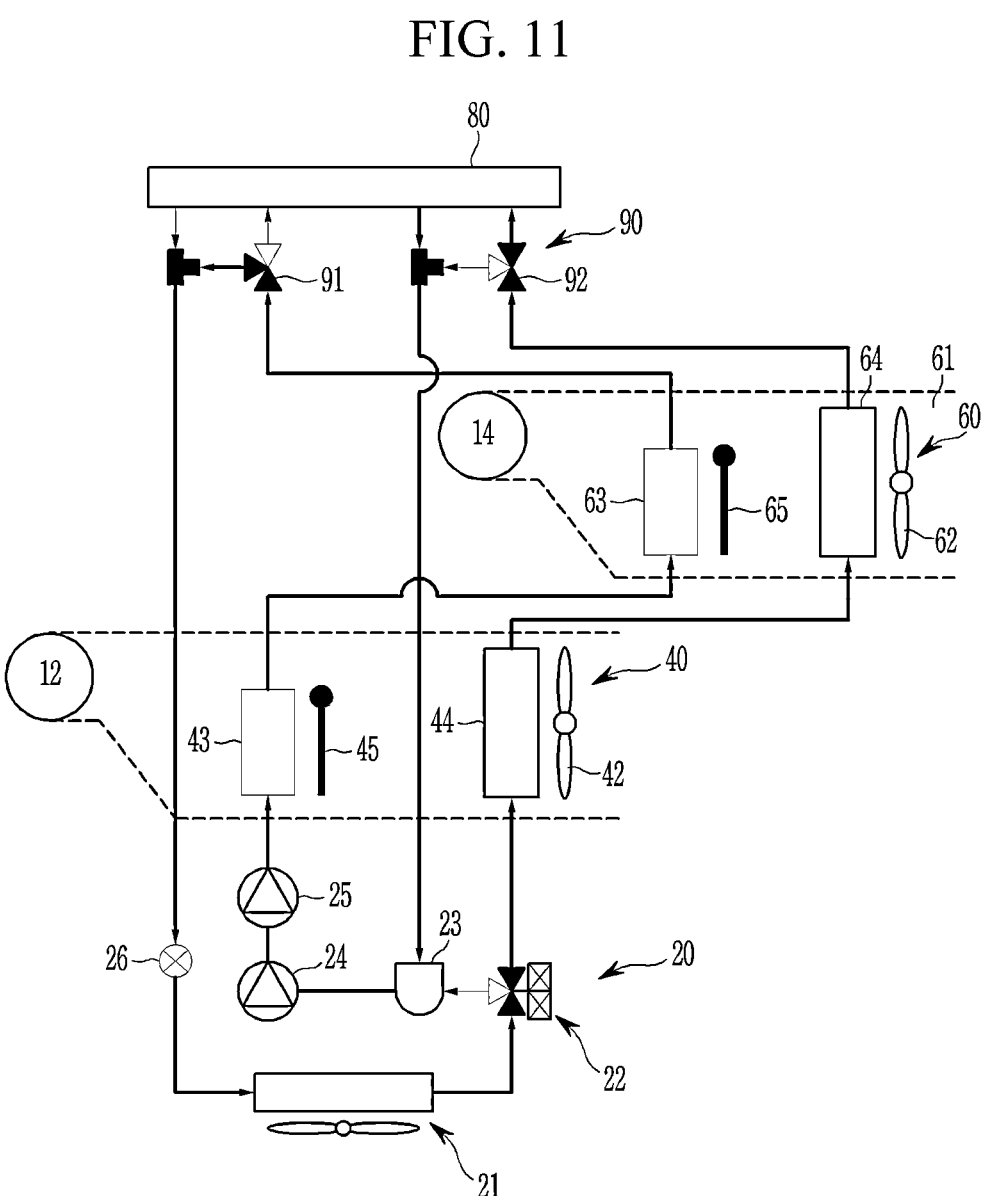
FIG. 11 is a diagram illustrating the configuration of cooling a cabin and a cabin floor using an air conditioning device and a second air conditioning device of a cabin cooling/heating system for a vehicle and a floor heat exchanger according to another embodiment of the present disclosure.
Figure 12:
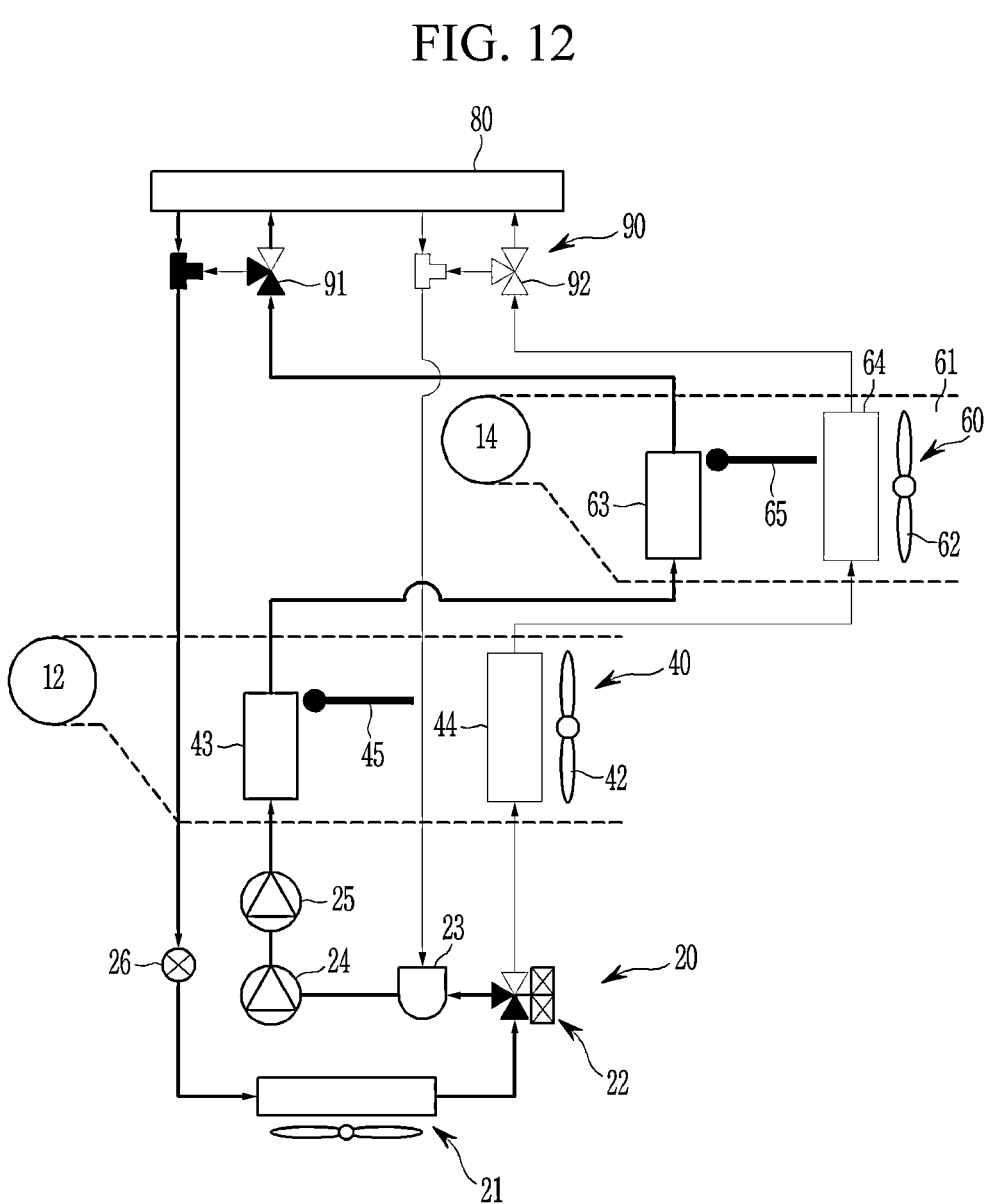
FIG. 12 is a diagram illustrating the configuration of heating a cabin and a cabin floor using an air conditioning device and a second air conditioning device of a cabin cooling/heating system for a vehicle and a floor heat exchanger according to another embodiment of the present disclosure.

FIG. 7 is a diagram illustrating a case in which an air conditioning device of a cabin cooling/heating system for a vehicle according to another embodiment of the present disclosure is used to cool a cabin. FIG. 8 is a diagram illustrating a case in which an air conditioning device of a cabin cooling/heating system for a vehicle according to another embodiment of the present disclosure is used to heat a cabin. FIG. 9 is a diagram illustrating a case in which an air conditioning device and a second air conditioning device of a cabin cooling/heating system for a vehicle according to another embodiment of the present disclosure are used to cool a cabin. FIG. 10 is a diagram illustrating a case in which an air conditioning device and a second air conditioning device of a cabin cooling/heating system for a vehicle according to another embodiment of the present disclosure are used to heat a cabin. FIG. 11 is a diagram illustrating a case in which an air conditioning device and a second air conditioning device of a cabin cooling/heating system for a vehicle are used to cool a cabin, and a floor heat exchanger is used to cool a cabin floor, according to another embodiment of the present disclosure. FIG. 12 is a diagram illustrating a case in which an air conditioning device and a second air conditioning device of a cabin cooling/heating system for a vehicle are used to heat a cabin, and a floor heat exchanger is used to heat a cabin floor, according to another embodiment of the present disclosure.

As illustrated in FIGS. 7 to 12, the cabin cooling/heating system for a vehicle according to another embodiment of the present disclosure includes the heat pump system 20, the air conditioning device 40, the second air conditioning device 60, and the floor heat exchanger 80.

The heat pump system 20 is configured to generate the cold refrigerant by expanding the refrigerant at one position, generate the hot refrigerant by compressing the refrigerant at another position, and send the generated cold or hot refrigerant to the air conditioning device 40. The heat pump system 20 may include the external heat exchanger 21, the first expansion valve 22, the accumulator 23, the first and second compressors 24 and 25, and the second expansion valve 26.

The external heat exchanger 21 lowers or raises the temperature of the refrigerant by blowing air to the refrigerant and sends the refrigerant to the first expansion valve 22.

The first expansion valve 22 receives the refrigerant from the external heat exchanger 21. The first expansion valve 22 may lower the temperature of the refrigerant (generate the cold refrigerant) by expanding the refrigerant and send the cold refrigerant to the air conditioning device 40. Alternatively, the first expansion valve 22 may send the refrigerant to the accumulator 23 without expanding the refrigerant.

The accumulator 23 receives the refrigerant, which is not expanded by the first expansion valve 22, or receives the refrigerant having passed through the air conditioning device 40, the second air conditioning device 60, and/or the floor heat exchanger 80. The accumulator 23 removes moisture from the refrigerant, separates the liquid refrigerant and the gaseous refrigerant contained in the refrigerant, and sends the gaseous refrigerant to the first compressor 24.

The first and second compressors 24 and 25 receive the refrigerant from the accumulator 23 and raise the temperature of the refrigerant (generate the hot refrigerant) by compressing the refrigerant. The first and second compressors 24 and 25 send the hot refrigerant to the air conditioning device 40.

The second expansion valve 26 receives the refrigerant from the second air conditioning device 60 and sends the refrigerant to the external heat exchanger 21 after or without expanding the refrigerant.

The air conditioning device 40 is fluidly connected to the heat pump system 20 and receives the cold or hot refrigerant generated by the heat pump system 20. The air conditioning device 40 generates the cold or warm air by heat exchange between the cold refrigerant and the air or between the hot refrigerant and the air. As illustrated in FIG. 6, at least a part of the air conditioning device 40 is mounted in the front cabin 12 and configured to cool or heat the cabin, particularly the front cabin 12 by blowing the generated cold or warm air into the cabin. The air conditioning device 40 sends the cold or hot refrigerant, which has exchanged heat with the air, to the second air conditioning device 60.

The air conditioning device 40 includes the air passageway 41, the internal condenser 43, and the internal evaporator 44 disposed in the air passageway 41.

The air passageway 41 allows the inside or the outside of the vehicle 10 to communicate with the front cabin 12 so that the inside air or the outside air of the vehicle 10 flows to the front cabin 12. The air blower 42 is disposed in the air passageway 41 and blows the inside air or the outside air into the air passageway 41.

The internal condenser 43 is disposed in the air passageway 41 and configured to generate the warm air by heating the inside air or the outside air passing through the internal condenser 43 and supply the generated warm air into the cabin, particularly the front cabin 12 to heat the cabin. The internal condenser 43 is connected to the second compressor 25, receives the hot refrigerant from the second compressor 25, and heats the inside air or the outside air, which passes through the internal condenser 43, by using the hot refrigerant. The air door 45 is mounted in the air passageway 41 through which the inside air or the outside air flows toward the internal condenser 43 from the inside or the outside of the vehicle 10. The air door 45 selectively opens or closes the air passageway 41 through which the inside air or the outside air flows toward the internal condenser 43. Therefore, the inside air or the outside air is heated by the internal condenser 43 when the air door 45 opens the air passageway 41. The inside air or the outside air is not heated by the internal condenser 43 when the air door 45 closes the air passageway 41. The hot refrigerant, which has circulated through the internal condenser 43, flows to the second air conditioning device 60.

The internal evaporator 44 is disposed in the air passageway 41 and configured to generate the cold air by cooling the inside air or the outside air passing through the internal evaporator 44 and supply the generated cold air into the cabin, particularly the front cabin 12 to cool the cabin. The internal evaporator 44 is connected to the first expansion valve 22, receives the cold refrigerant from the first expansion valve 22, and cools the inside air or the outside air, which passes through the internal evaporator 44, by evaporating the cold refrigerant. The cold refrigerant, which has circulated through the internal evaporator 44, flows to the second air conditioning device 60.

The second air conditioning device 60 is fluidly connected to the air conditioning device 40 and receives the cold or hot refrigerant from the air conditioning device 40. The second air conditioning device 60 generates the cold or warm air by heat exchange between the cold refrigerant and the air or between the hot refrigerant and the air. As illustrated in FIG. 6, at least a part of the second air conditioning device 60 is mounted in the rear cabin 14 and configured to cool or heat the cabin, particularly the rear cabin 14 by blowing the generated cold or warm air into the cabin. The second air conditioning device 60 sends the cold or hot refrigerant, which has exchanged heat with the air, to the floor heat exchanger 80.

The second air conditioning device 60 includes a second air passageway 61, a second internal condenser 63, and a second internal evaporator 64 disposed in the second air passageway 61.

The second air passageway 61 allows the inside or the outside of the vehicle 10 to communicate with the rear cabin 14 so that the inside air of the vehicle 10 or the outside air flows to the rear cabin 14. A second air blower 62 is disposed in the second air passageway 61 and blows the inside air or the outside air into the second air passageway 61.

The second internal condenser 63 is disposed in the second air passageway 61 and configured to generate the warm air by heating the inside air or the outside air passing through the second internal condenser 63 and supply the generated warm air into the cabin, particularly the rear cabin 14 to heat the cabin. The second internal condenser 63 is connected to the internal condenser 43, receives the hot refrigerant from the internal condenser 43, and heats the inside air or the outside air, which passes through the second internal condenser 63, by using the hot refrigerant. A second air door 65 is disposed in the second air passageway 61 through which the inside air or the outside air flows toward the second internal condenser 63 from the inside or outside of the vehicle 10. The second air door 65 selectively opens or closes the second air passageway 61 through which the inside air or the outside air flows toward the second internal condenser 63. Therefore, the inside air or the outside air is heated by the second internal condenser 63 when the second air door 65 opens the second air passageway 61. The inside air or the outside air is not heated by the second internal condenser 63 when the second air door 65 closes the second air passageway 61. The hot refrigerant, which has circulated through the second internal condenser 63, flows toward the floor heat exchanger 80.

The second internal evaporator 64 is disposed in the second air passageway 61 and configured to generate the cold air by cooling the inside air or the outside air passing through the second internal evaporator 64. Additionally, the second internal evaporator 64 is configured to supply the generated cold air into the cabin, particularly the rear cabin 14 to cool the cabin. The second internal evaporator 64 is connected to the internal evaporator 44, receives the cold refrigerant from the internal evaporator 44, and cools the inside air or the outside air, which passes through the second internal evaporator 64, by evaporating the cold refrigerant. The cold refrigerant, which has circulated through the second internal evaporator 64, flows toward the floor heat exchanger 80.

The floor heat exchanger 80 is fluidly connected to the second air conditioning device 60 and configured to receive the cold or hot refrigerant from the second air conditioning device 60. As illustrated in FIG. 6, the floor heat exchanger 80 is mounted in the cabin floor of the rear cabin 14 and configured to cool or heat the cabin floor of the rear cabin 14 by circulating the cold or hot refrigerant, which is received from the second air conditioning device 60, through the cabin floor. The floor heat exchanger 80 returns the cold or hot refrigerant, which has circulated through the floor heat exchanger 80, to the heat pump system 20. More specifically, the cold refrigerant, which has circulated through the floor heat exchanger 80, flows to the accumulator 23 of the heat pump system 20, and the hot refrigerant, which has circulated through the floor heat exchanger 80, flows to the second expansion valve 26 of the heat pump system 20.

The cabin cooling/heating system for a vehicle further includes the line switching valve module 90. The line switching valve module 90 is disposed between the second air conditioning device 60 and the floor heat exchanger 80 and configured to send the cold or hot refrigerant from the second air conditioning device 60 to the floor heat exchanger 80 or return the cold or hot refrigerant to the heat pump system 20. In other words, the line switching valve module 90 selectively and fluidly connects the second air conditioning device 60 to the floor heat exchanger 80 or the heat pump system 20. Therefore, the cold or hot refrigerant in the second air conditioning device 60 may return to the heat pump system 20 while passing through the floor heat exchanger 80 or return to the heat pump system 20 without passing through the floor heat exchanger 80, depending on the switching operation of the line switching valve module 90.

More specifically, the line switching valve module 90 includes the first line switching valve 91 and the second line switching valve 92. The first line switching valve 91 is fluidly connected to the second internal condenser 63, such that the hot refrigerant, which has passed through the second internal condenser 63, flows to the first line switching valve 91. The first line switching valve 91 is selectively connected to the floor heat exchanger 80 or the second expansion valve 26 of the heat pump system 20, such that the hot refrigerant selectively flows to the floor heat exchanger 80 or the second expansion valve 26 of the heat pump system 20. The second line switching valve 92 is fluidly connected to the second internal evaporator 64, such that the cold refrigerant, which has passed through the second internal evaporator 64, flows to the second line switching valve 92. The second line switching valve 92 is selectively connected to the floor heat exchanger 80 or the accumulator 23 of the heat pump system 20, such that the cold refrigerant selectively flows to the floor heat exchanger 80 or the accumulator 23 of the heat pump system 20.

As illustrated in FIG. 7, in order to cool the cabin by using the air conditioning device 40 of the cabin cooling/heating system for a vehicle, the external heat exchanger 21 of the heat pump system 20 cools the refrigerant by heat exchange between the refrigerant and the air and sends the cooled refrigerant to the first expansion valve 22. The first expansion valve 22 generates the cold refrigerant by expanding the refrigerant and sends the cold refrigerant to the internal evaporator 44 of the air conditioning device 40. In this case, the air blower 42 disposed in the air passageway 41 blows the inside air or the outside air to the internal evaporator 44 so that the inside air or the outside air exchanges heat with the cold refrigerant passing through the internal evaporator 44. In addition, the air door 45 closes the air passageway 41 directed toward the internal condenser 43 so that the inside air or the outside air does not pass through the internal condenser 43. Therefore, the cold air is generated, and the cold air is blown to the front cabin 12 through the outlet of the air passageway 41 disposed in the front cabin 12, thereby cooling the cabin.

The cold refrigerant, which has passed through the internal evaporator 44, flows to the second internal evaporator 64, but the inside air or the outside air is not blown to the second air passageway 61 because the second air blower 62 does not operate. Therefore, the cold refrigerant, which has flown to the second internal evaporator 64, merely passes through the second internal evaporator 64 while cooling the inside air or the outside air.

The cold refrigerant, which has passed through the second internal evaporator 64, flows to the second line switching valve 92, and the second line switching valve 92 sends the cold refrigerant to the accumulator 23 of the heat pump system 20. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 compress the refrigerant and send the compressed refrigerant to the internal condenser 43. However, the air door 45 closes the air passageway 41 directed toward the internal condenser 43, such that the inside air, the outside air, or the cold air is not heated by the refrigerant passing through the internal condenser 43.

The refrigerant, which has passed through the internal condenser 43, flows to the second internal condenser 63, but the inside air or the outside air is not blown to the second air passageway 61 because the second air blower 62 does not operate. In addition, the second air door 65 also closes the second air passageway 61 directed toward the second internal condenser 63. Therefore, the refrigerant, which has flown to the second internal condenser 63, merely passes through the second internal condenser 63 without heating the inside air or the outside air.

The refrigerant, which has passed through the second internal condenser 63, flows to the first line switching valve 91, and the first line switching valve 91 sends the refrigerant to the second expansion valve 26 of the heat pump system 20. However, the second expansion valve 26 returns the refrigerant back to the external heat exchanger 21 without expanding the refrigerant.

As illustrated in FIG. 8, in order to heat the cabin by using the air conditioning device 40 of the cabin cooling/heating system for a vehicle, the external heat exchanger 21 of the heat pump system 20 absorbs heat from the outside air, evaporates the refrigerant expanded in the second expansion valve 26, and sends the refrigerant to the first expansion valve 22. The first expansion valve 22 sends the refrigerant to the accumulator 23 without expanding the refrigerant. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 generate the hot refrigerant by compressing the refrigerant and send the hot refrigerant to the internal condenser 43. In this case, the air blower 42 disposed in the air passageway 41 blows the inside air or the outside air toward the internal condenser 43, and the air door 45 opens the air passageway 41 directed toward the internal condenser 43, such that the inside air or the outside air is heated while exchanging heat with the hot refrigerant passing through the internal condenser 43. In addition, the inside air or the outside air passes through the internal evaporator 44 disposed in the air passageway 41, but the inside air or the outside air is not cooled because the refrigerant does not flow through the internal evaporator 44. Therefore, the warm air is generated, and the warm air is blown to the front cabin 12 through the outlet of the air passageway 41 disposed in the front cabin 12, thereby heating the cabin.

The hot refrigerant, which has passed through the internal condenser 43, flows to the second internal condenser 63. However, because the second air blower 62 does not operate, the inside air or the outside air is not blown to the second air passageway 61, and the second air door 65 closes the second air passageway 61 directed toward the second internal condenser 63. Therefore, the hot refrigerant, which has flown to the second internal condenser 63, merely passes through the second internal condenser 63 without heating the inside air or the outside air.

The hot refrigerant, which has passed through the second internal condenser 63, flows to the first line switching valve 91, and the first line switching valve 91 sends the hot refrigerant to the second expansion valve 26 of the heat pump system 20. The second expansion valve 26 expands the refrigerant and returns the expanded refrigerant back to the external heat exchanger 21.

As illustrated in FIG. 9, in order to cool the cabin by using the air conditioning device 40 and the second air conditioning device 60 of the cabin cooling/heating system for a vehicle, the external heat exchanger 21 of the heat pump system 20 cools the refrigerant by heat exchange between the refrigerant and the air and sends the cooled refrigerant to the first expansion valve 22. The first expansion valve 22 generates the cold refrigerant by expanding the refrigerant and sends the cold refrigerant to the internal evaporator 44 of the air conditioning device 40. In this case, the air blower 42 disposed in the air passageway 41 blows the inside air or the outside air to the internal evaporator 44 so that the inside air or the outside air exchanges heat with the cold refrigerant passing through the internal evaporator 44. In addition, the air door 45 closes the air passageway 41 directed toward the internal condenser 43 so that the inside air or the outside air does not pass through the internal condenser 43. Therefore, the cold air is generated, and the cold air is blown to the front cabin 12 through the outlet of the air passageway 41 disposed in the front cabin 12, thereby cooling the cabin.

The cold refrigerant, which has passed through the internal evaporator 44, flows to the second internal evaporator 64. In this case, the second air blower 62 disposed in the second air passageway 61 blows the inside air or the outside air to the second internal evaporator 64 so that the inside air or the outside air exchanges heat with the cold refrigerant passing through the second internal evaporator 64. In addition, the second air door 65 closes the second air passageway 61 directed toward the second internal condenser 63 so that the inside air or the outside air does not pass through the second internal condenser 63. Therefore, the cold air is generated, and the cold air is blown to the rear cabin 14 through the outlet of the second air passageway 61 disposed in the rear cabin 14, thereby cooling the cabin.

The cold refrigerant, which has passed through the second internal evaporator 64, flows to the second line switching valve 92, and the second line switching valve 92 sends the cold refrigerant to the accumulator 23 of the heat pump system 20. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 compress the refrigerant and send the compressed refrigerant to the internal condenser 43. However, the air door 45 closes the air passageway 41 directed toward the internal condenser 43, such that the inside air, the outside air or the cold air is not heated by the refrigerant passing through the internal condenser 43.

The refrigerant, which has passed through the internal condenser 43, flows to the second internal condenser 63, but the second air door 65 closes the second air passageway 61 directed toward the second internal condenser 63. Therefore, the refrigerant, which has flown to the second internal condenser 63, merely passes through the second internal condenser 63 without heating the inside air or the outside air.

The refrigerant, which has passed through the second internal condenser 63, flows to the first line switching valve 91, and the first line switching valve 91 sends the refrigerant to the second expansion valve 26 of the heat pump system 20. However, the second expansion valve 26 returns the refrigerant back to the external heat exchanger 21 without expanding the refrigerant.

As illustrated in FIG. 10, in order to heat the cabin by using the air conditioning device 40 and the second air conditioning device 60 of the cabin cooling/heating system for a vehicle, the external heat exchanger 21 of the heat pump system 20 absorbs heat from the outside air, evaporates the refrigerant expanded in the second expansion valve 26, and sends the refrigerant to the first expansion valve 22. The first expansion valve 22 sends the refrigerant to the accumulator 23 without expanding the refrigerant. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 generate the hot refrigerant by compressing the refrigerant and send the hot refrigerant to the internal condenser 43. In this case, the air blower 42 disposed in the air passageway 41 blows the inside air or the outside air toward the internal condenser 43, and the air door 45 opens the air passageway 41 directed toward the internal condenser 43, such that the inside air or the outside air is heated while exchanging heat with the hot refrigerant passing through the internal condenser 43. In addition, the inside air or the outside air passes through the internal evaporator 44 disposed in the air passageway 41, but the inside air or the outside air is not cooled because the refrigerant does not flow through the internal evaporator 44. Therefore, the warm air is generated, and the warm air is blown to the front cabin 12 through the outlet of the air passageway 41 disposed in the front cabin 12, thereby heating the cabin.

The hot refrigerant, which has passed through the internal condenser 43, flows to the second internal condenser 63. In this case, the second air blower 62 disposed in the second air passageway 61 blows the inside air or the outside air toward the second internal condenser 63, and the second air door 65 opens the second air passageway 61 directed toward the second internal condenser 63, such that the inside air or the outside air is heated while exchanging heat with the hot refrigerant passing through the second internal condenser 63. In addition, the inside air or the outside air passes through the second internal evaporator 64 disposed in the second air passageway 61, but the inside air or the outside air is not cooled because the refrigerant does not flow through the second internal evaporator 64. Therefore, the warm air is generated, and the warm air is blown to the rear cabin 14 through the outlet of the second air passageway 61 disposed in the rear cabin 14, thereby heating the cabin.

The hot refrigerant, which has passed through the second internal condenser 63, flows to the first line switching valve 91, and the first line switching valve 91 sends the hot refrigerant to the second expansion valve 26 of the heat pump system 20. The second expansion valve 26 expands the refrigerant and returns the expanded refrigerant back to the external heat exchanger 21.

As illustrated in FIG. 11, in order to cool the cabin by using the air conditioning device 40 and the second air conditioning device 60 of the cabin cooling/heating system for a vehicle and cool the cabin floor by using the floor heat exchanger 80, the external heat exchanger 21 of the heat pump system 20 cools the refrigerant by heat exchange between the refrigerant and the air and sends the cooled refrigerant to the first expansion valve 22. The first expansion valve 22 generates the cold refrigerant by expanding the refrigerant and sends the cold refrigerant to the internal evaporator 44 of the air conditioning device 40. In this case, the air blower 42 disposed in the air passageway 41 blows the inside air or the outside air to the internal evaporator 44 so that the inside air or the outside air exchanges heat with the cold refrigerant passing through the internal evaporator 44. In addition, the air door 45 closes the air passageway 41 directed toward the internal condenser 43 so that the inside air or the outside air does not pass through the internal condenser 43. Therefore, the cold air is generated, and the cold air is blown to the front cabin 12 through the outlet of the air passageway 41 disposed in the front cabin 12, thereby cooling the cabin.

The cold refrigerant, which has passed through the internal evaporator 44, flows to the second internal evaporator 64. In this case, the second air blower 62 disposed in the second air passageway 61 blows the inside air or the outside air to the second internal evaporator 64 so that the inside air or the outside air exchanges heat with the cold refrigerant passing through the second internal evaporator 64. In addition, the second air door 65 closes the second air passageway 61 directed toward the second internal condenser 63 so that the inside air or the outside air does not pass through the second internal condenser 63. Therefore, the cold air is generated, and the cold air is blown to the rear cabin 14 through the outlet of the second air passageway 61 disposed in the rear cabin 14, thereby cooling the cabin.

The cold refrigerant, which has passed through the second internal evaporator 64, flows to the second line switching valve 92, and the second line switching valve 92 sends the cold refrigerant to the floor heat exchanger 80. The cold refrigerant cools the cabin floor while circulating through the floor heat exchanger 80 and flows to the accumulator 23 of the heat pump system 20. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 compress the refrigerant and send the compressed refrigerant to the internal condenser 43. However, the air door 45 closes the air passageway 41 directed toward the internal condenser 43, such that the inside air, the outside air, or the cold air is not heated by the refrigerant passing through the internal condenser 43.

The refrigerant, which has passed through the internal condenser 43, flows to the second internal condenser 63, but the second air door 65 closes the second air passageway 61 directed toward the second internal condenser 63. Therefore, the refrigerant, which has flown to the second internal condenser 63, merely passes through the second internal condenser 63 without heating the inside air or the outside air.

The refrigerant, which has passed through the second internal condenser 63, flows to the first line switching valve 91, and the first line switching valve 91 sends the refrigerant to the second expansion valve 26 of the heat pump system 20. However, the second expansion valve 26 returns the refrigerant back to the external heat exchanger 21 without expanding the refrigerant.

As illustrated in FIG. 12, in order to heat the cabin by using the air conditioning device 40 and the second air conditioning device 60 of the cabin cooling/heating system for a vehicle, the external heat exchanger 21 of the heat pump system 20 absorbs heat from the outside air, evaporates the refrigerant, and sends the refrigerant to the first expansion valve 22. The first expansion valve 22 sends the refrigerant to the accumulator 23 without expanding the refrigerant. The accumulator 23 removes moisture from the refrigerant, separates the gaseous refrigerant and the liquid refrigerant contained in the refrigerant, and sends the gaseous refrigerant to the first and second compressors 24 and 25. The first and second compressors 24 and 25 generate the hot refrigerant by compressing the refrigerant and send the hot refrigerant to the internal condenser 43. In this case, the air blower 42 disposed in the air passageway 41 blows the inside air or the outside air toward the internal condenser 43, and the air door 45 opens the air passageway 41 directed toward the internal condenser 43, such that the inside air or the outside air is heated while exchanging heat with the hot refrigerant passing through the internal condenser 43. In addition, the inside air or the outside air passes through the internal evaporator 44 disposed in the air passageway 41, but the inside air or the outside air is not cooled because the refrigerant does not flow through the internal evaporator 44. Therefore, the warm air is generated, and the warm air is blown to the front cabin 12 through the outlet of the air passageway 41 disposed in the front cabin 12, thereby heating the cabin.

The hot refrigerant, which has passed through the internal condenser 43, flows to the second internal condenser 63. In this case, the second air blower 62 disposed in the second air passageway 61 blows the inside air or the outside air toward the second internal condenser 63. The second air door 65 opens the second air passageway 61 directed toward the second internal condenser 63, such that the inside air or the outside air is heated while exchanging heat with the hot refrigerant passing through the second internal condenser 63. In addition, the inside air or the outside air passes through the second internal evaporator 64 disposed in the second air passageway 61, but the inside air or the outside air is not cooled because the refrigerant does not flow through the second internal evaporator 64. Therefore, the warm air is generated, and the warm air is blown to the rear cabin 14 through the outlet of the second air passageway 61 disposed in the rear cabin 14, thereby heating the cabin.

The hot refrigerant, which has passed through the second internal condenser 63, flows to the first line switching valve 91, and the first line switching valve 91 sends the hot refrigerant to the floor heat exchanger 80. The hot refrigerant heats the cabin floor while circulating through the floor heat exchanger 80 and flows to the second expansion valve 26 of the heat pump system 20. The second expansion valve 26 expands the refrigerant and returns the expanded refrigerant back to the external heat exchanger 21.

While the embodiments of the present disclosure have been described, the present disclosure is not limited to the embodiments. The present disclosure covers all modifications that can be easily made from the embodiments of the present disclosure by those having ordinary skill in the art and considered as being equivalent to the present disclosure.

What is claimed is:

1. A cabin cooling/heating system for a vehicle comprising:

a heat pump system configured to generate a cold refrigerant by expanding a refrigerant at one position and generate a hot refrigerant by compressing the refrigerant at another position;

an air conditioning device fluidly connected to the heat pump system and configured to:

receive the cold or hot refrigerant from the heat pump system, generate cold or warm air by heat exchange between inside air of the vehicle or outside air of the vehicle and the cold or hot refrigerant, and blow the cold or warm air to a front cabin of the vehicle;

a floor heat exchanger mounted in a cabin floor of a rear cabin of the vehicle, and fluidly connected to the air conditioning device, the floor heat exchanger configured to:

receive the cold or hot refrigerant from the air conditioning device, cool or heat the cabin floor by circulating the cold or hot refrigerant through the cabin floor, and return the cold or hot refrigerant, which has circulated through the cabin floor, back to the heat pump system; and a line switching valve module disposed between the air conditioning device and the floor heat exchanger and configured to send the cold or hot refrigerant, which has passed through the air conditioning device, to the floor heat exchanger or send the cold or hot refrigerant to the heat pump system, wherein the heat pump system comprises:

an external heat exchanger configured to lower a temperature of the refrigerant when cooling at least one of the front cabin or the cabin floor, and configured to raise the temperature of the refrigerant when heating at least one of the front cabin or the cabin floor;

a first expansion valve configured to receive the refrigerant from the external heat exchanger, wherein the first expansion valve is configured to generate the cold refrigerant by expanding the refrigerant and send the cold refrigerant to the air conditioning device when cooling at least one of the front cabin or the cabin floor, and further configured not to expand the refrigerant when heating at least one of the front cabin or the cabin floor;

an accumulator configured to receive the refrigerant, which is not expanded, from the first expansion valve when heating at least one of the front cabin or the cabin floor and receive the refrigerant that has passed through the air conditioning device or the floor heat exchanger when cooling at least one of the front cabin or the cabin floor, wherein the accumulator is further configured to separate a liquid refrigerant and a gaseous refrigerant contained in the refrigerant; and at least one compressor configured to receive the refrigerant from the accumulator, generate the hot refrigerant by compressing the refrigerant, and send the hot refrigerant to the air conditioning device.

2. The cabin cooling/heating system of claim 1, wherein the heat pump system further comprises a second expansion valve configured to receive the refrigerant from the air conditioning device or the floor heat exchanger, and return the refrigerant to the external heat exchanger after or without expanding the refrigerant.

3. The cabin cooling/heating system of claim 2, wherein the second expansion valve expands the refrigerant and returns the refrigerant to the external heat exchanger to heat the front cabin or the cabin floor, and returns the refrigerant to the external heat exchanger without expanding the refrigerant to cool the front cabin and/or the cabin floor.

4. The cabin cooling/heating system of claim 2, wherein the air conditioning device comprises:

an air passageway configured to allow the inside air or the outside air of the vehicle to communicate with the front cabin, the air passageway defining a passageway through which the inside air or the outside air flows to the front cabin;

an air blower configured to blow the inside air or the outside air into the air passageway;

an internal condenser disposed in the air passageway, connected to the at least one compressor, and configured to receive the hot refrigerant from the at least one compressor, heat the inside air or the outside air in the air passageway, and send the hot refrigerant to the line switching valve module; and an internal evaporator disposed in the air passageway, connected to the first expansion valve, and configured to receive the cold refrigerant from the first expansion valve, cool the inside air or the outside air in the air passageway, and send the cold refrigerant to the line switching valve module.

5. The cabin cooling/heating system of claim 4, wherein the air conditioning device further comprises an air door configured to selectively open or close the air passageway through which the inside air or the outside air flows to the internal condenser.

6. The cabin cooling/heating system of claim 5, wherein the air door opens the air passageway, through which the inside air or the outside air flows to the internal condenser, to heat the front cabin and/or the cabin floor, and wherein the air door closes the air passageway, through which the inside air or the outside air flows to the internal condenser, to cool the front cabin and/or the cabin floor.

7. The cabin cooling/heating system of claim 4, wherein the line switching valve module comprises:

a first line switching valve fluidly connected to the internal condenser and configured to receive the hot refrigerant from the internal condenser and selectively send the hot refrigerant to the floor heat exchanger or the second expansion valve; and a second line switching valve fluidly connected to the internal evaporator, and configured to receive the cold refrigerant from the internal evaporator and selectively send the cold refrigerant to the floor heat exchanger or the accumulator.

8. A cabin cooling/heating system for a vehicle comprising:

a heat pump system configured to generate a cold refrigerant by expanding a refrigerant at one position and generate a hot refrigerant by compressing the refrigerant at another position;

an air conditioning device fluidly connected to the heat pump system and configured to receive the cold or hot refrigerant from the heat pump system, generate cold or warm air by heat exchange between inside air of the vehicle or outside air and the cold or hot refrigerant, and blow the cold or warm air to a front cabin of the vehicle;

a second air conditioning device fluidly connected to the air conditioning device and configured to receive the cold or hot refrigerant from the air conditioning device, generate the cold or the warm air by heat exchange between the inside air or the outside air of the vehicle and the cold or hot refrigerant, and blow the cold or warm air to a rear cabin of the vehicle;

a floor heat exchanger mounted in a cabin floor of the rear cabin of the vehicle, fluidly connected to the second air conditioning device, and configured to receive the cold or hot refrigerant from the second air conditioning device, cool or heat the cabin floor by circulating the cold or hot refrigerant through the cabin floor, and return the cold or hot refrigerant, which has circulated through the cabin floor, back to the heat pump system; and a line switching valve module disposed between the second air conditioning device and the floor heat exchanger and configured to send the cold or hot refrigerant, which has passed through the second air conditioning device, to the floor heat exchanger or send the cold or hot refrigerant to the heat pump system.

9. The cabin cooling/heating system of claim 8, wherein the heat pump system comprises:

an external heat exchanger configured to lower or raise a temperature of the refrigerant;

a first expansion valve configured to receive the refrigerant from the external heat exchanger, generate the cold refrigerant by expanding the refrigerant, and send either the cold refrigerant or the refrigerant without being expanded to the air conditioning device;

an accumulator configured to receive the refrigerant, which is not expanded, from the first expansion valve or receive the refrigerant that has passed through the air conditioning device, the second air conditioning device, and/or the floor heat exchanger, the accumulator being configured to separate a liquid refrigerant and a gaseous refrigerant contained in the refrigerant; and at least one compressor configured to receive the refrigerant from the accumulator, generate the hot refrigerant by compressing the refrigerant, and send the hot refrigerant to the air conditioning device.

10. The cabin cooling/heating system of claim 9, wherein the heat pump system further comprises a second expansion valve configured to receive the refrigerant from the second air conditioning device or the floor heat exchanger and return the refrigerant to the external heat exchanger after or without expanding the refrigerant.

11. The cabin cooling/heating system of claim 10, wherein the second expansion valve expands the refrigerant and returns the refrigerant to the external heat exchanger to heat the front cabin and/or the cabin floor, and returns the refrigerant to the external heat exchanger without expanding the refrigerant to cool the front cabin and/or the cabin floor.

12. The cabin cooling/heating system of claim 10, wherein the air conditioning device comprises:

an air passageway configured to allow the inside air or the outside air of the vehicle to communicate with the front cabin, the air passageway defining a passageway through which the inside air or the outside air flows to the front cabin;

an air blower configured to blow the inside air or the outside air into the air passageway;

an internal condenser disposed in the air passageway, connected to the at least one compressor, and configured to receive the hot refrigerant from the at least one compressor, heat the inside air or the outside air in the air passageway, and send the hot refrigerant to the second air conditioning device; and an internal evaporator disposed in the air passageway, connected to the first expansion valve, and configured to receive the cold refrigerant from the first expansion valve, cool the inside air or the outside air in the air passageway, and send the cold refrigerant to the second air conditioning device.

13. The cabin cooling/heating system of claim 12, wherein the air conditioning device further comprises an air door configured to selectively open or close the air passageway through which the inside air or the outside air flows to the internal condenser.

14. The cabin cooling/heating system of claim 13, wherein the second air conditioning device comprises:

a second air passageway configured to allow the inside air or the outside air of the vehicle to communicate with the rear cabin, the second air passageway defining a passageway through which the inside air or the outside air flows to the rear cabin;

a second air blower configured to blow the inside air or the outside air into the second air passageway;

a second internal condenser disposed in the second air passageway, connected to the internal condenser, and configured to receive the hot refrigerant from the internal condenser, heat the inside air or the outside air in the second air passageway, and send the hot refrigerant to the line switching valve module; and a second internal evaporator disposed in the second air passageway, connected to the internal evaporator, and configured to receive the cold refrigerant from the internal evaporator, cool the inside air or the outside air in the second air passageway, and send the cold refrigerant to the line switching valve module.

15. The cabin cooling/heating system of claim 14, wherein the second air conditioning device further comprises a second air door configured to selectively open or close the second air passageway through which the inside air or the outside air flows to the second internal condenser.

16. The cabin cooling/heating system of claim 15, wherein the air door opens the air passageway, through which the inside air or the outside air flows to the internal condenser, to heat the front cabin and/or the cabin floor by using the air conditioning device, wherein the second air door opens the second air passageway, through which the inside air or the outside air flows to the second internal condenser, to heat the rear cabin and/or the cabin floor by using the second air conditioning device, and wherein the air door closes the air passageway, through which the inside air or the outside air flows to the internal condenser, and the second air door closes the second air passageway, through which the inside air or the outside air flows to the second internal condenser, to cool both the rear and front cabin and/or the cabin floor.

17. The cabin cooling/heating system of claim 14, wherein the line switching valve module comprises:

a first line switching valve fluidly connected to the second internal condenser and configured to receive the hot refrigerant from the second internal condenser and selectively send the hot refrigerant to the floor heat exchanger or the second expansion valve; and a second line switching valve fluidly connected to the second internal evaporator and configured to receive the cold refrigerant from the second internal evaporator and selectively send the cold refrigerant to the floor heat exchanger or the accumulator.

* * * * *